United States Patent
Hatada

(10) Patent No.: US 12,393,002 B2
(45) Date of Patent: Aug. 19, 2025

(54) ZOOM LENS AND IMAGE PICKUP APPARATUS HAVING THE SAME

(71) Applicant: CANON KABUSHIKI KAISHA, Tokyo (JP)

(72) Inventor: Takahiro Hatada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 614 days.

(21) Appl. No.: 17/584,541

(22) Filed: Jan. 26, 2022

(65) Prior Publication Data

US 2022/0244508 A1 Aug. 4, 2022

(30) Foreign Application Priority Data

Jan. 29, 2021 (JP) ................. 2021-013841

(51) Int. Cl.
| | |
|---|---|
| G02B 15/14 | (2006.01) |
| G02B 15/177 | (2006.01) |
| G02B 27/64 | (2006.01) |
| H04N 23/69 | (2023.01) |
| G02B 13/00 | (2006.01) |

(52) U.S. Cl.
CPC ....... *G02B 15/1425* (2019.08); *G02B 15/177* (2013.01); *G02B 27/646* (2013.01); *H04N 23/69* (2023.01); *G02B 13/003* (2013.01)

(58) Field of Classification Search
CPC .............. G02B 15/1425; G02B 15/177; G02B 27/646; G02B 13/003; G02B 15/144503; G02B 15/145519; G02B 15/1465; G02B 15/1455; G02B 15/14; G02B 27/64; H04N 23/69; H04N 5/232
See application file for complete search history.

(56) References Cited

U.S. PATENT DOCUMENTS

| | | |
|---|---|---|
| 9,036,265 B2 | 5/2015 | Hatada |
| 9,684,155 B2 | 6/2017 | Hatada |
| (Continued) | | |

FOREIGN PATENT DOCUMENTS

| | | |
|---|---|---|
| CN | 102176084 A | 9/2011 |
| CN | 105652423 A | 6/2016 |
| (Continued) | | |

OTHER PUBLICATIONS

Extended European Search Report issued by the European Patent Office on Jun. 15, 2022 in corresponding EP Patent Application No. 22153284.9.

(Continued)

*Primary Examiner* — Bumsuk Won
*Assistant Examiner* — John Curtis Sipes
(74) *Attorney, Agent, or Firm* — Carter, DeLuca & Farrell LLP

(57) ABSTRACT

A zoom lens includes, in order from an object side to an image side, a first lens unit having a negative refractive power, and a rear unit having a positive refractive power as a whole. A distance between the first lens unit and the rear unit is changed during zooming. The rear unit includes a subunit that is moved in a direction having a component of a direction orthogonal to an optical axis during image stabilization. The first lens unit includes, in order from the object side to the image side, three or more negative lenses. A predetermined condition is satisfied.

20 Claims, 22 Drawing Sheets

(56) References Cited

U.S. PATENT DOCUMENTS

| | | | |
|---|---|---|---|
| 10,120,170 B2 | 11/2018 | Hatada | |
| 10,768,396 B2* | 9/2020 | Kawamura | G02B 5/005 |
| 10,895,722 B2 | 1/2021 | Hatada | |
| 10,914,929 B2* | 2/2021 | Kawamura | G02B 15/145523 |
| 2006/0119939 A1* | 6/2006 | Misaka | G02B 27/646 |
| | | | 359/557 |
| 2014/0009832 A1 | 1/2014 | Sugita | |
| 2014/0307338 A1* | 10/2014 | Kawamura | G02B 9/60 |
| | | | 359/754 |
| 2015/0124322 A1* | 5/2015 | Onozaki | G02B 27/646 |
| | | | 359/557 |
| 2015/0146085 A1* | 5/2015 | Hatada | G02B 13/06 |
| | | | 348/360 |
| 2017/0068079 A1 | 3/2017 | Kawamura et al. | |
| 2020/0132974 A1 | 4/2020 | Kimura et al. | |
| 2020/0218043 A1* | 7/2020 | Cheng | G02B 13/0035 |
| 2020/0257095 A1 | 8/2020 | Kimura et al. | |
| 2020/0271906 A1 | 8/2020 | Kimura | |
| 2020/0319436 A1 | 10/2020 | Hatada | |
| 2021/0181462 A1 | 6/2021 | Hatada | |
| 2022/0146801 A1 | 5/2022 | Hatada | |

FOREIGN PATENT DOCUMENTS

| | | |
|---|---|---|
| CN | 112180575 A | 1/2021 |
| JP | 2017-122743 A | 7/2017 |
| JP | 2017-122745 A | 7/2017 |
| JP | 2017-122746 A | 7/2017 |
| JP | 2017-122747 A | 7/2017 |
| JP | 2019-008031 A | 1/2019 |
| JP | 2019-105696 A | 6/2019 |
| JP | 2019-174510 A | 10/2019 |
| JP | 2019-215565 A | 12/2019 |
| JP | 2020-071439 A | 5/2020 |
| JP | 2020-118914 A | 8/2020 |
| JP | 2022-117249 A | 8/2022 |
| WO | 2013/031188 A1 | 3/2013 |
| WO | 2018/123672 A1 | 7/2018 |

OTHER PUBLICATIONS

Chinese Office Action issued by the China National Intellectual Property Administration on Jul. 23, 2024 in corresponding CN Patent Application No. 202210107003.X, with English translation.
Chinese Office Action issued in CN Patent Application No. 202210107003.X, dated Mar. 7, 2024, with English translation.
Notice of Reasons for Refusal issued by the Japanese Patent Office on Sep. 3, 2024 in corresponding JP Patent Application No. 2021-013841, with English translation.
Chinese Office Action issued by the China National Intellectual Property Administration on Dec. 16, 2024 in corresponding CN Patent Application No. 202210107003.X, with English translation.
Chinese Office Action issued by the China National Intellectual Property Administration on Mar. 13, 2025 in corresponding CN Patent Application No. 202210107003.X, with English translation.
Notice of Reasons for Refusal issued by the Japanese Patent Office on Apr. 22, 2025 in corresponding JP Patent Application No. 2024-228923, with English translation.

* cited by examiner

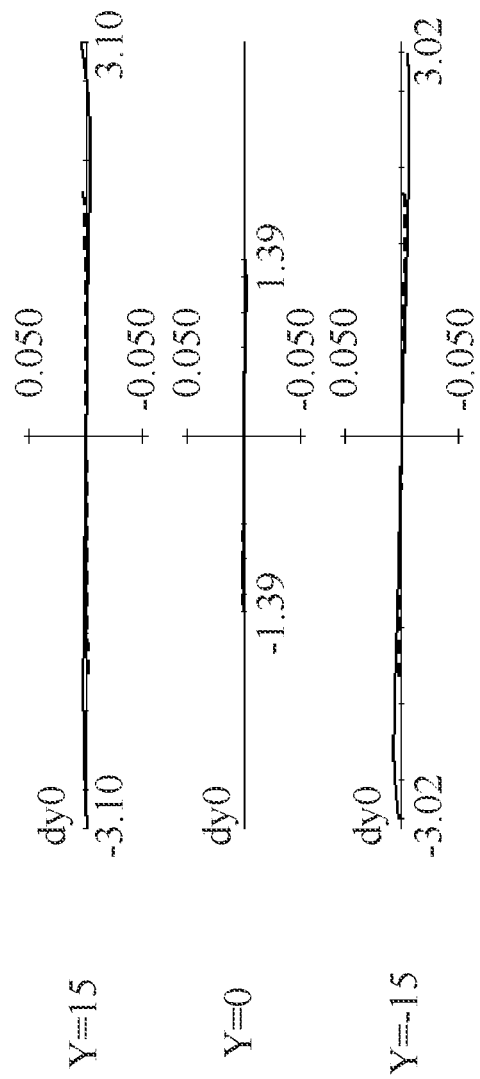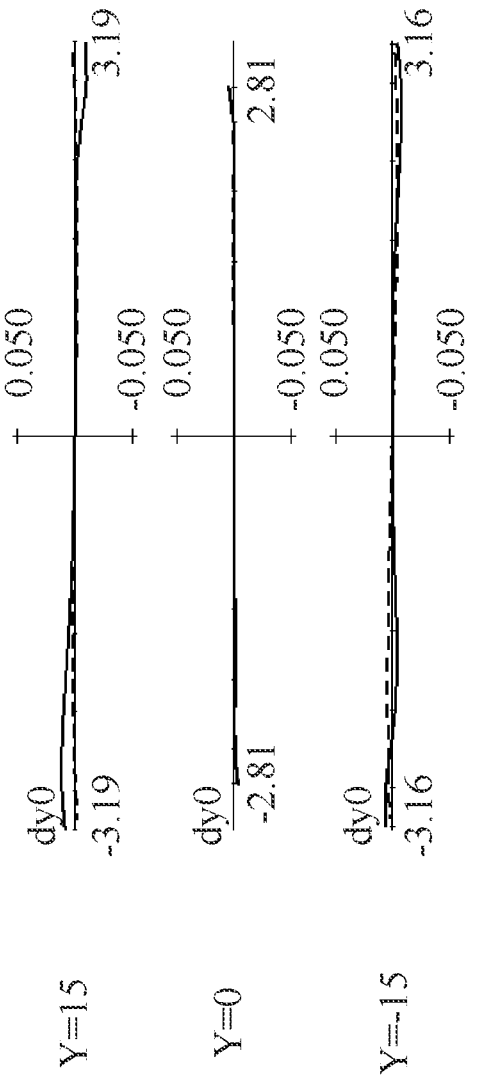
FIG. 3A
FIG. 3B

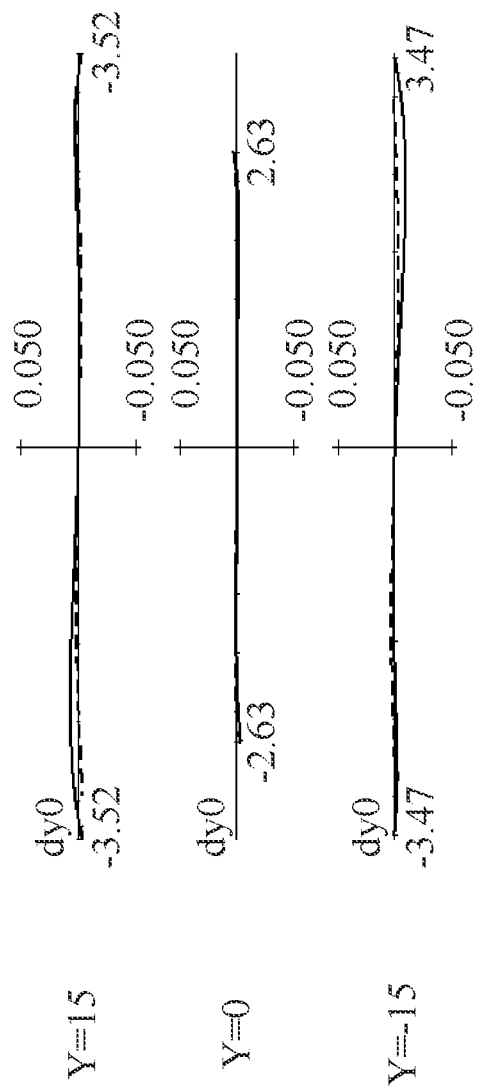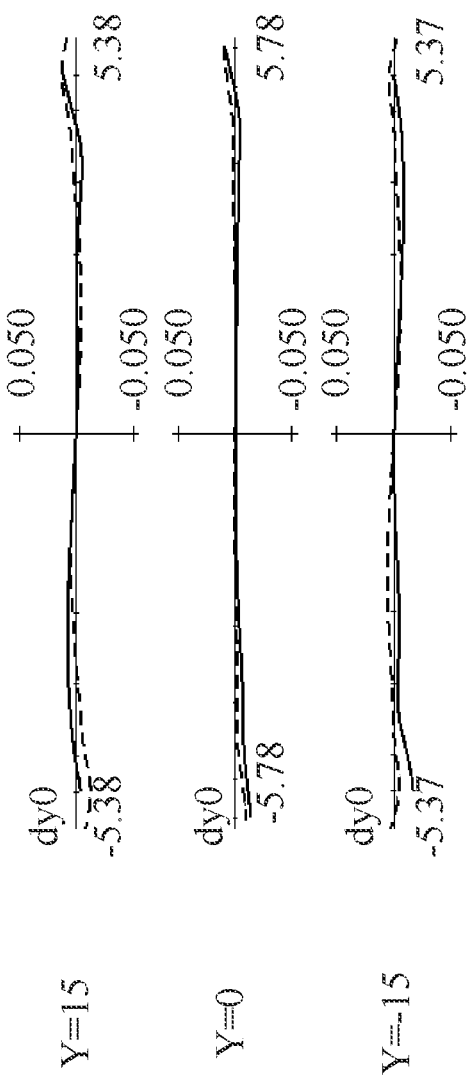

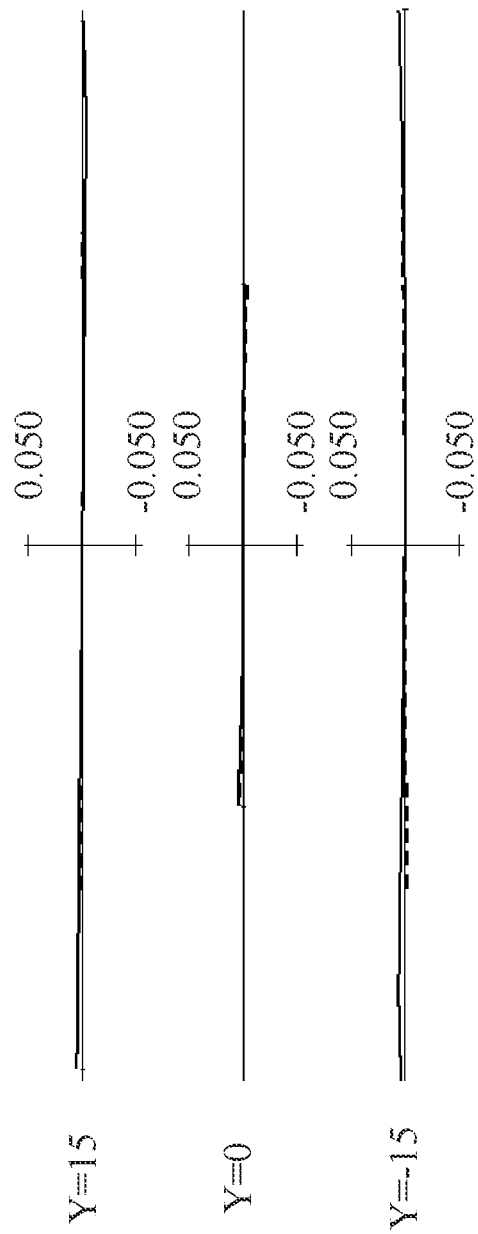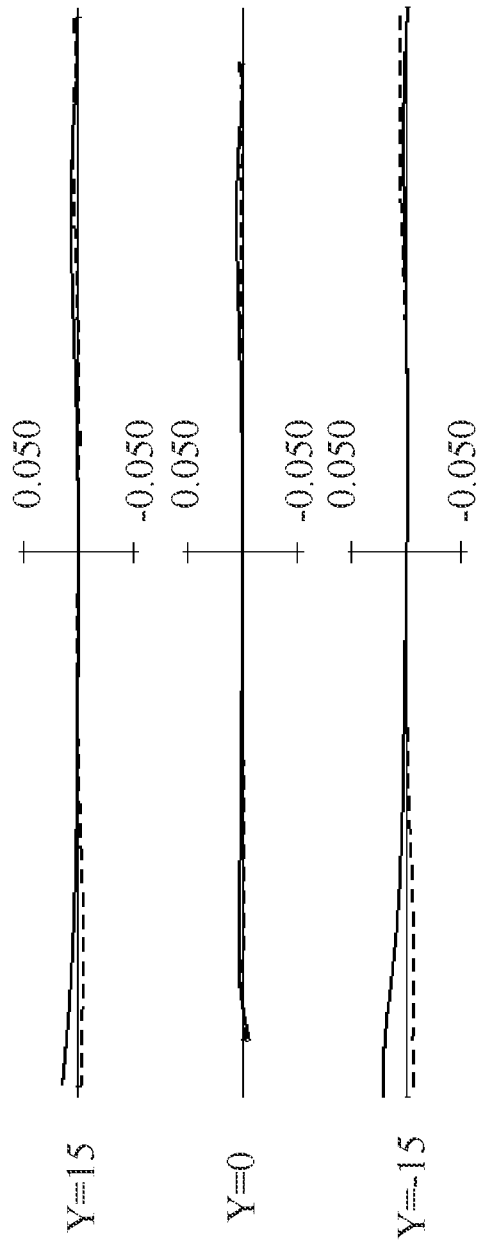

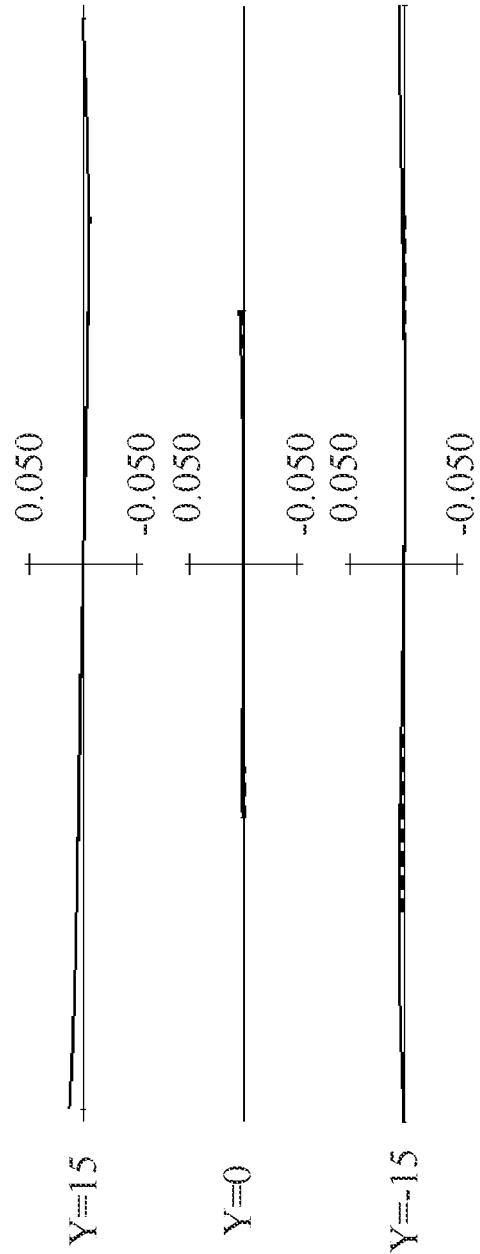
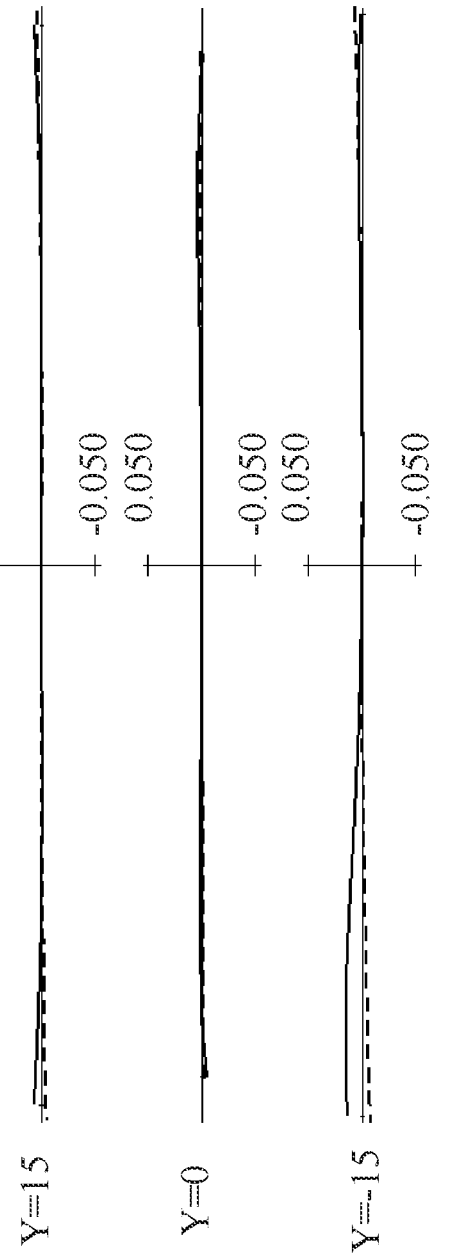

ZOOM LENS AND IMAGE PICKUP APPARATUS HAVING THE SAME

BACKGROUND OF THE INVENTION

Field of the Invention

The present invention relates to a zoom lens, which is suitable for a digital video camera, a digital still camera, a broadcasting camera, a film-based camera, a surveillance camera, an in-vehicle camera, and the like.

Description of the Related Art

A lens shift type image stabilizing mechanism that shifts part of an optical system in a direction orthogonal to an optical axis and a sensor shift type image stabilizing mechanism that shifts an image sensor in that direction have conventionally been known as an image stabilizing means. Japanese Patent Laid-Open No. ("JP") 2019-215565 discloses a zoom lens including a lens shift type image stabilizing mechanism.

In the zoom lens disclosed in JP 2019-215565, an eccentricity amount of the image stabilizing unit increases when a large correction amount is sought, and an image is blurred due to an eccentric aberration in the image stabilization.

When an ultra-wide-angle zoom lens with an angle of view exceeding 100° is used, the sensor shift type image stabilizing mechanism is often used because a large correction amount is available with a small shift amount. Since a moving amount of an image point to a change in an incident angle of a light ray incident on an optical system using the central projection method is not uniform on the imaging plane, a large image blur amount remains in the periphery of the imaging plane even when the image stabilization is made at the center of the imaging plane in a zoom lens that suppresses the distortion by the central projection method. If the projection method is brought to the equidistant projection method having no difference in image blur in order to suppress the image blur in the periphery of the imaging plane, the image will be greatly distorted and thus such a zoom lens is often used with an image pickup apparatus that has an electronic distortion correcting function that corrects the distortion in image processing. However, if the distortion in the central projection method is excessively generated, the image quality in the periphery of the imaging plane deteriorates due to the electronic distortion correction. It is therefore necessary to properly set the distortion in the central projection method in order to suppress the image quality deterioration in the periphery of the imaging plane by the image stabilization and the electronic distortion correction.

The lens shift type image stabilizing mechanism can suppress the image blur in the periphery of the imaging plane because the image stabilizing sensitivity (ratio of an image stabilizing amount to a unit moving amount of the image stabilizing unit) in the periphery of the imaging plane is higher than that at the center of the imaging plane. Therefore, it is desirable to mount the lens shift type image stabilizing mechanism on the ultra-wide-angle zoom lens.

SUMMARY OF THE INVENTION

The present invention provides a zoom lens and an image pickup apparatus having the same, each of which can maintain a high optical performance in image stabilization while achieving both a wide angle of view and miniaturization.

A zoom lens according to one aspect of the present invention includes, in order from an object side to an image side, a first lens unit having a negative refractive power, and a rear unit having a positive refractive power as a whole. A distance between the first lens unit and the rear unit is changed during zooming. The rear unit includes a subunit that is moved in a direction having a component of a direction orthogonal to an optical axis during image stabilization. The first lens unit includes, in order from the object side to the image side, three or more negative lenses. The following inequalities are satisfied:

$$-20 < \text{Dist\_w} < -8$$

$$-0.4 < f1/fLN < 0.7$$

where Dist_w is a distortion amount at a maximum image height in an in-focus state at infinity (on an infinity object) at a wide-angle end, f1 is a focal length of the first lens unit, and fLN is a focal length of a final lens unit closest to an image plane. An image pickup apparatus according to another aspect of the present invention includes the above zoom lens, and an image sensor configured to receive an image formed by the zoom lens.

Further features of the present invention will become apparent from the following description of exemplary embodiments with reference to the attached drawings.

BRIEF DESCRIPTION OF THE DRAWINGS

FIGS. 3A and 3B are lateral aberration diagrams of the zoom lens at the wide-angle end and at the telephoto end in the image stabilization in Example 1, respectively.

FIGS. 12A and 12B are lateral aberration diagrams of the zoom lens at the wide-angle end and at the telephoto end in the image stabilization in Example 4, respectively.

FIGS. 15A and 15B are lateral aberration diagrams of the zoom lens at the wide-angle end and at the telephoto end in the image stabilization in Example 5, respectively.

FIGS. 21A and 21B are lateral aberration diagrams of the zoom lens at the wide-angle end and at the telephoto end in the image stabilization in Example 7, respectively.

DESCRIPTION OF THE EMBODIMENTS

Figure 1:
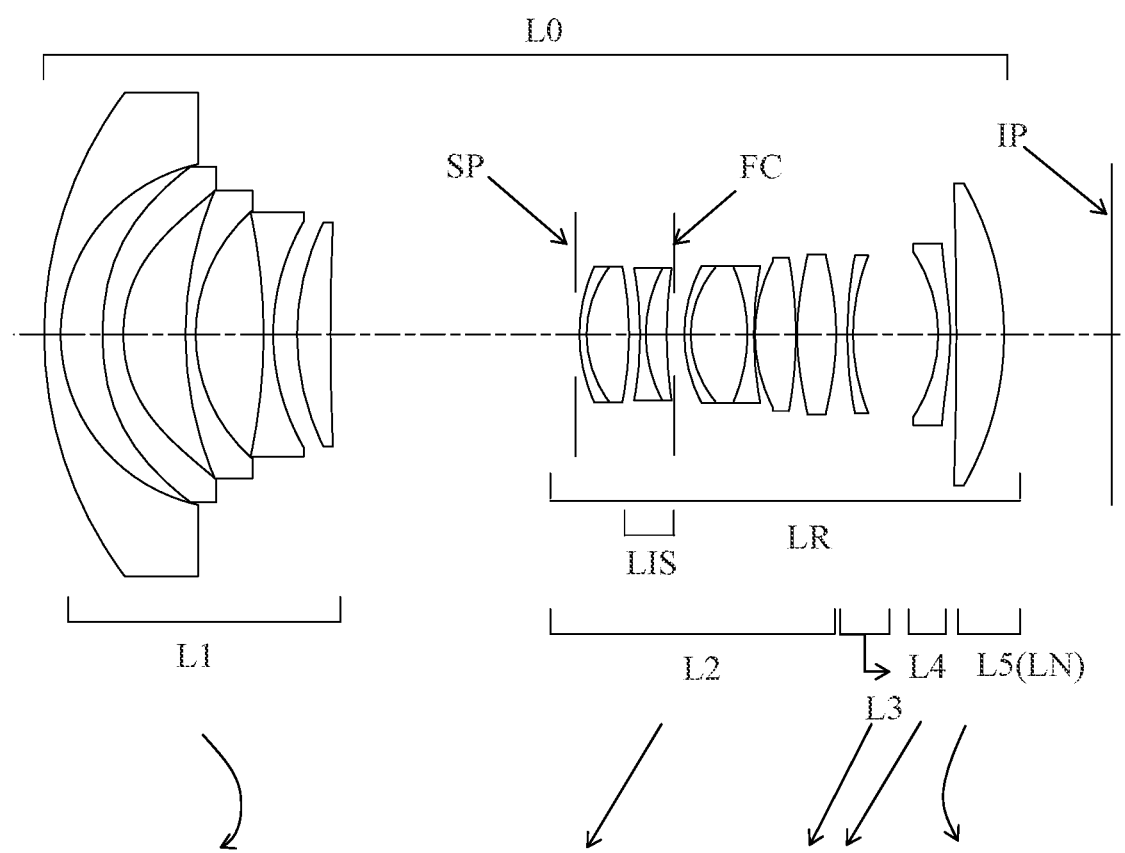
FIG. 1 is a sectional view of a zoom lens according to Example 1.
Figure 2A:
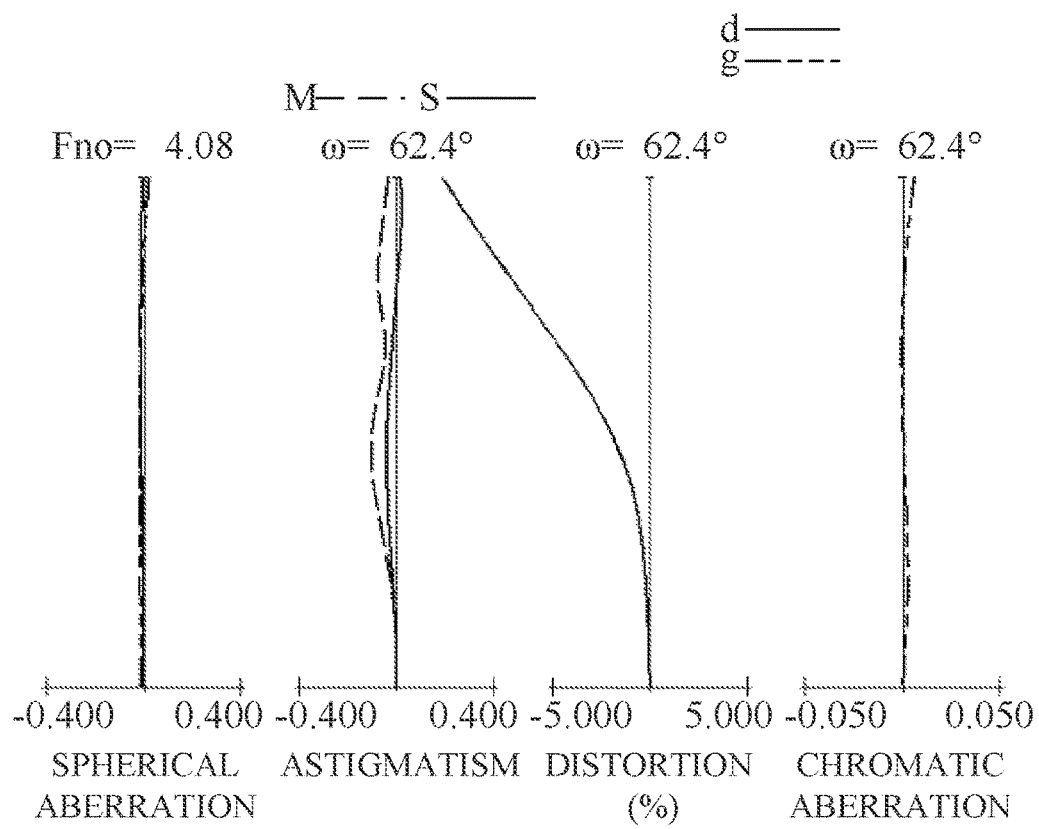
FIGS. 2A and 2B are longitudinal aberration diagrams of the zoom lens at the wide-angle end and at the telephoto end in Example 1, respectively.
Figure 2B:
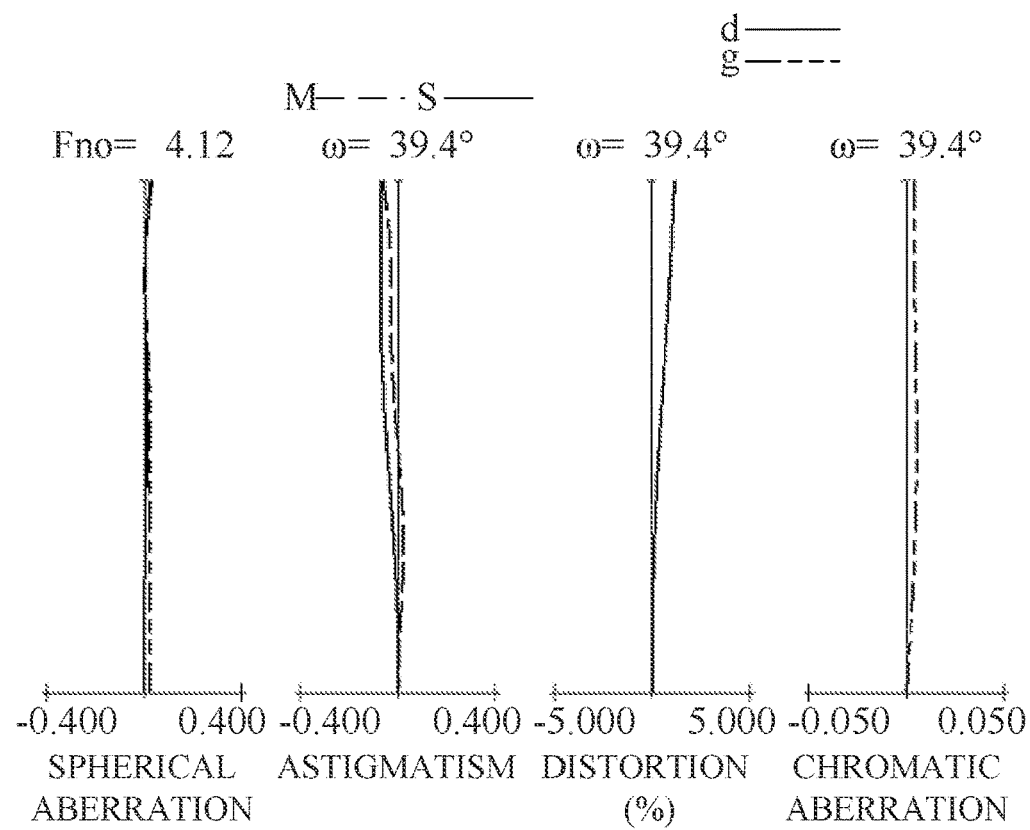
Figure 4:
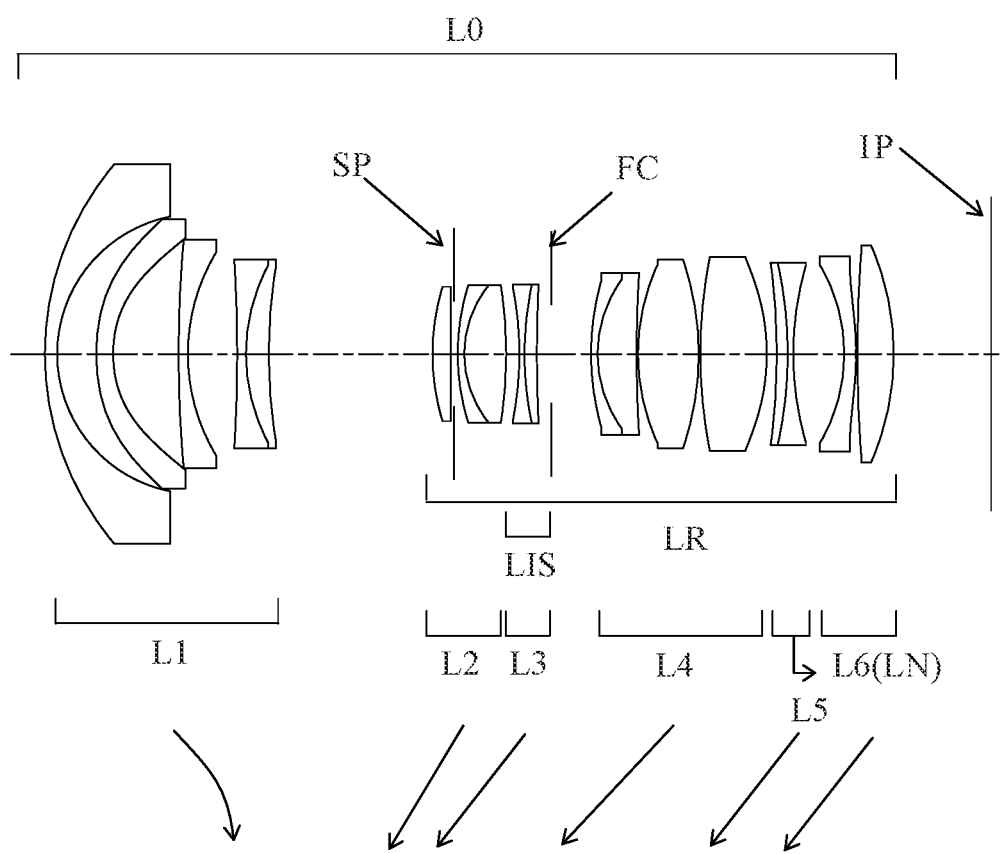
FIG. 4 is a sectional view of a zoom lens according to Example 2.
Figure 5A:
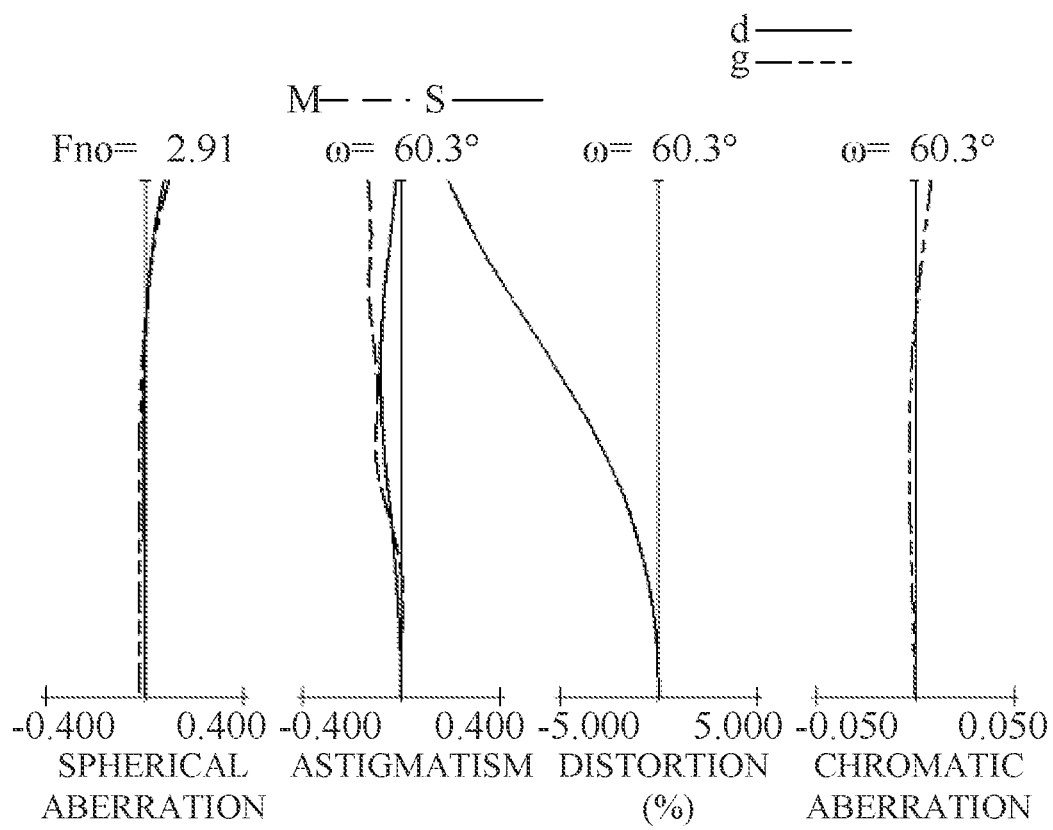
FIGS. 5A and 5B are longitudinal aberration diagrams of the zoom lens at the wide-angle end and at the telephoto end in Example 2, respectively.
Figure 5B:
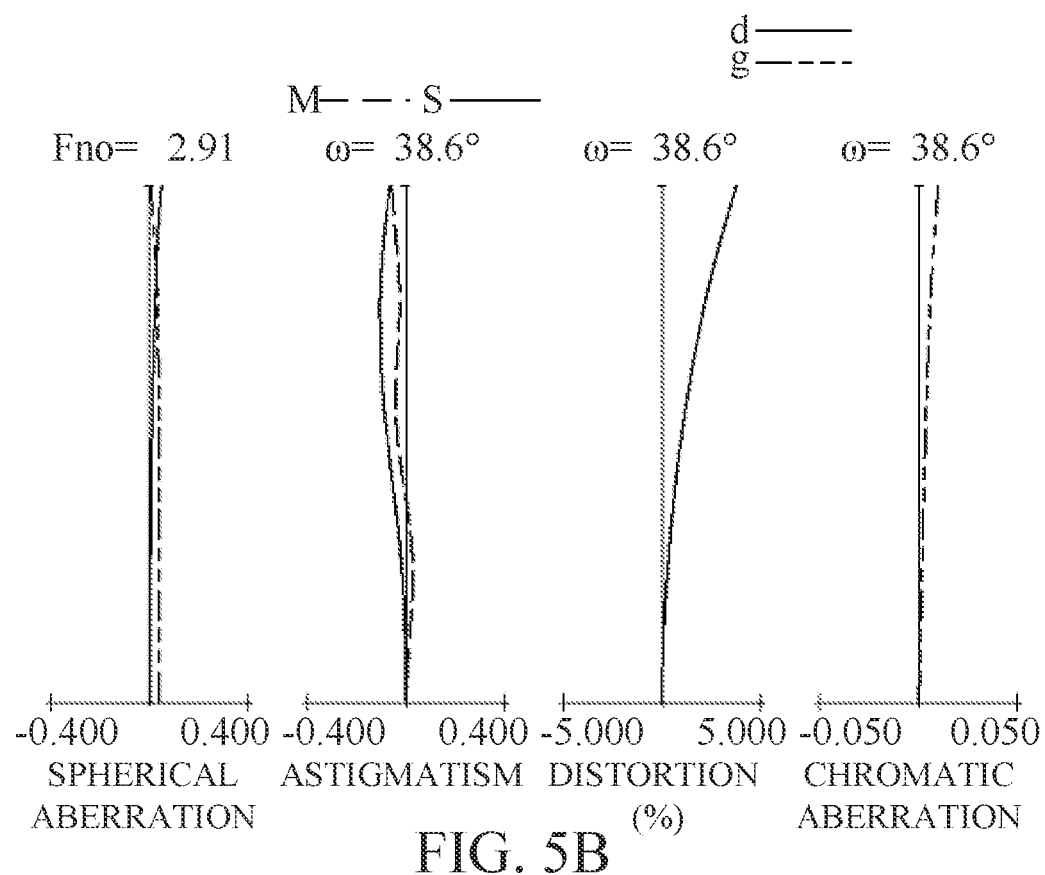
Figure 6A:
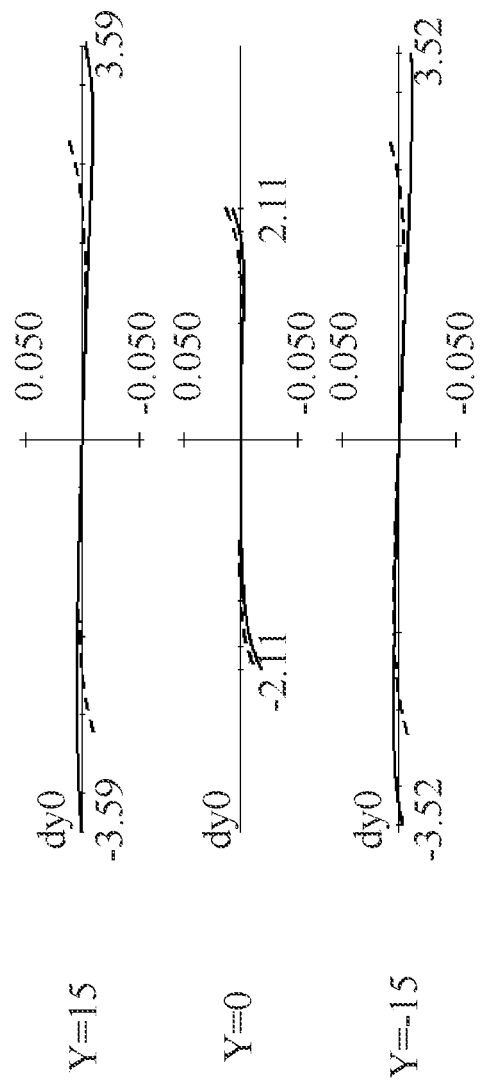
FIGS. 6A and 6B are lateral aberration diagrams of the zoom lens at the wide-angle end and at the telephoto end in the image stabilization in Example 2, respectively.
Figure 6B:
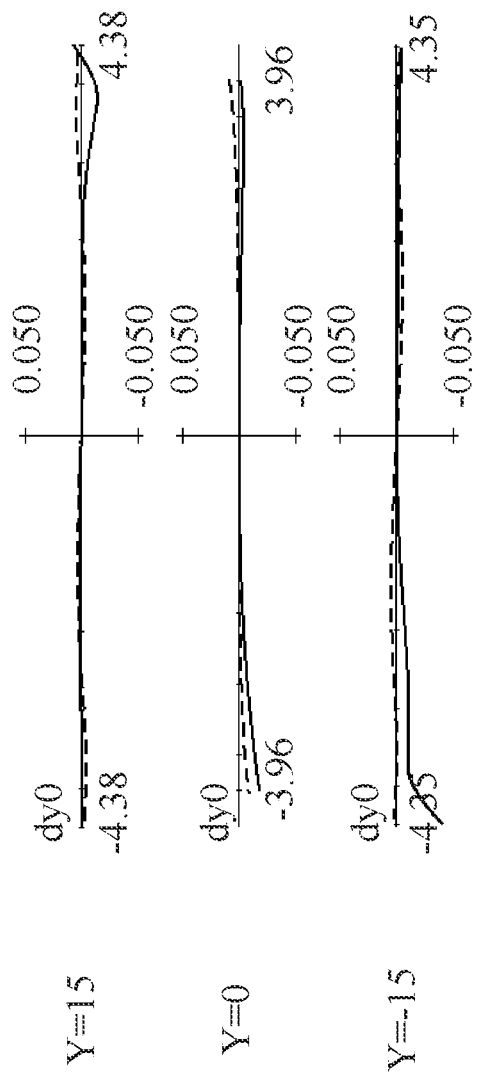
Figure 7:
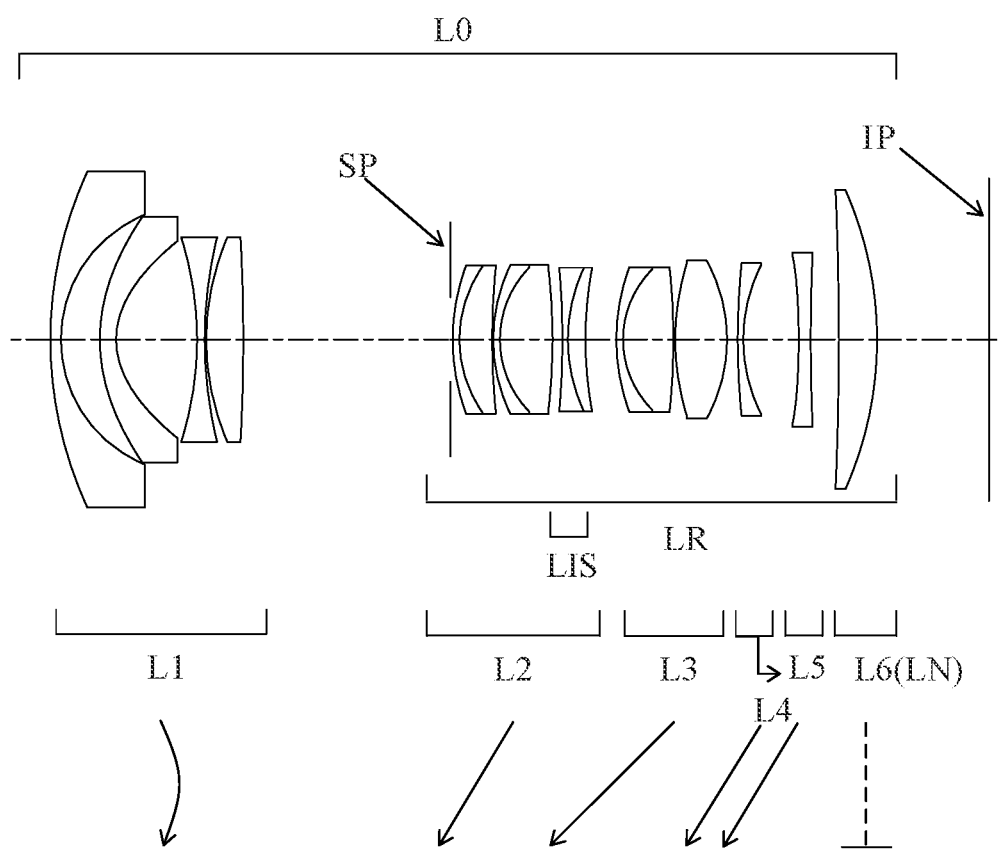
FIG. 7 is a sectional view of a zoom lens according to Example 3.
Figure 8A:
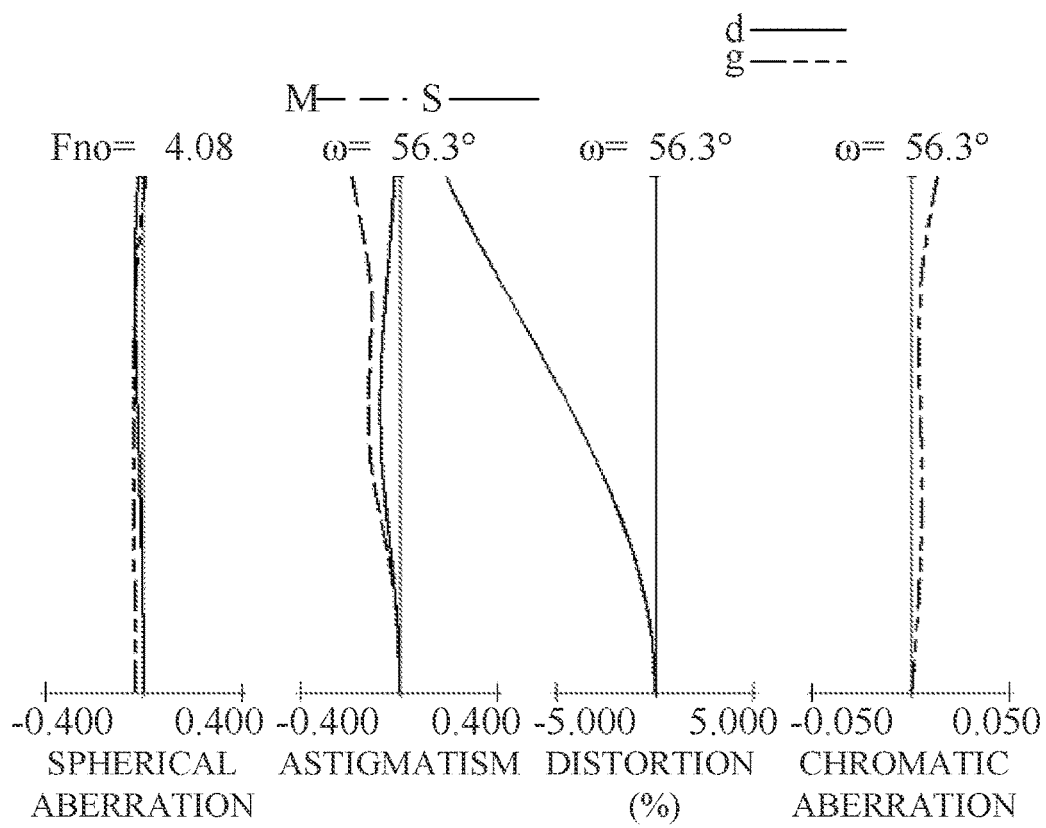
FIGS. 8A and 8B are longitudinal aberration diagrams of the zoom lens at the wide-angle end and at the telephoto end in Example 3, respectively.
Figure 8B:
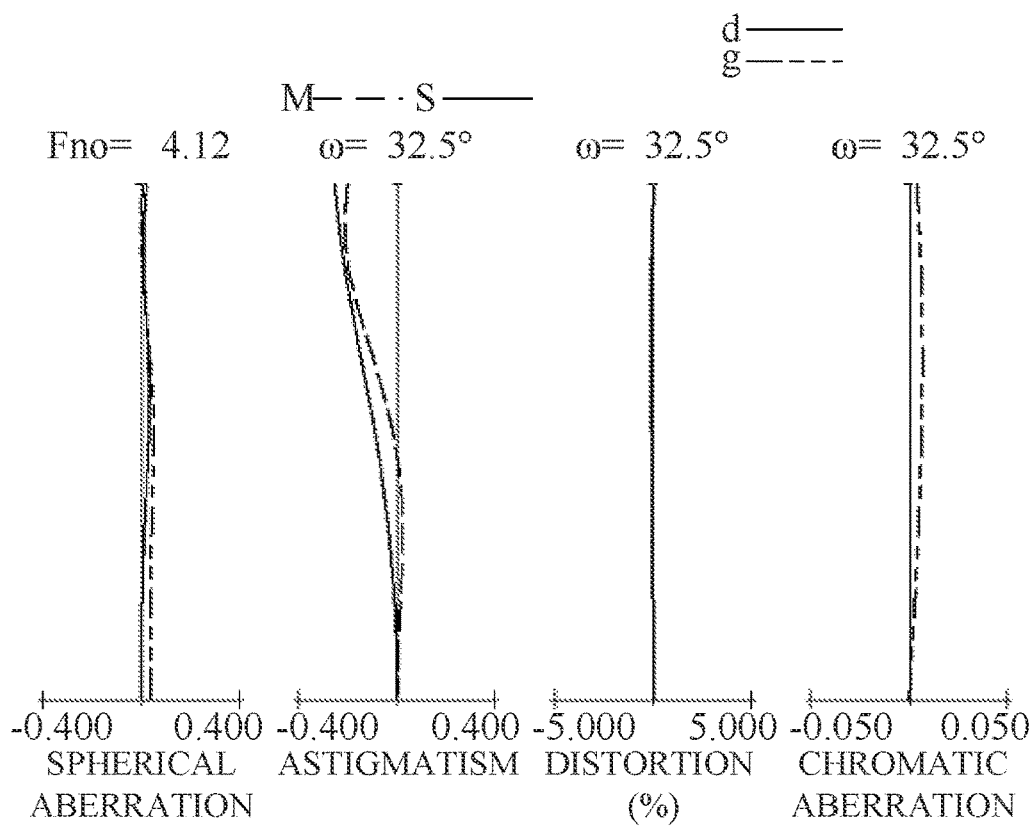
Figure 9A:
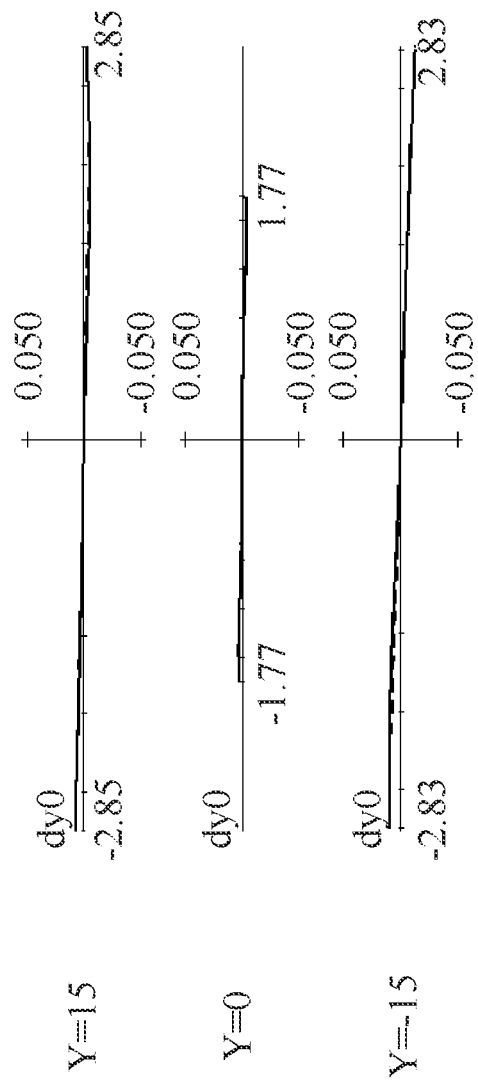
FIGS. 9A and 9B are lateral aberration diagrams of the zoom lens at the wide-angle end and at the telephoto end in the image stabilization in Example 3, respectively.
Figure 9B:
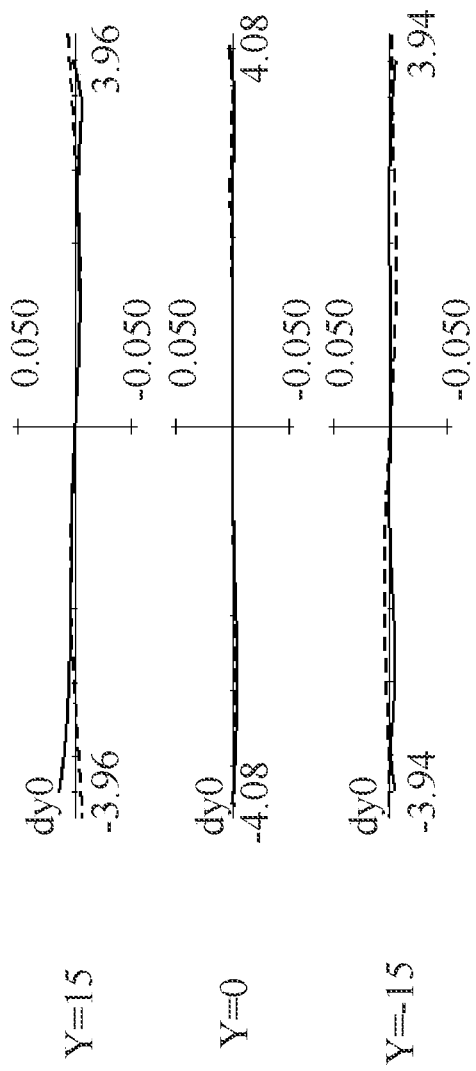
Figure 10:
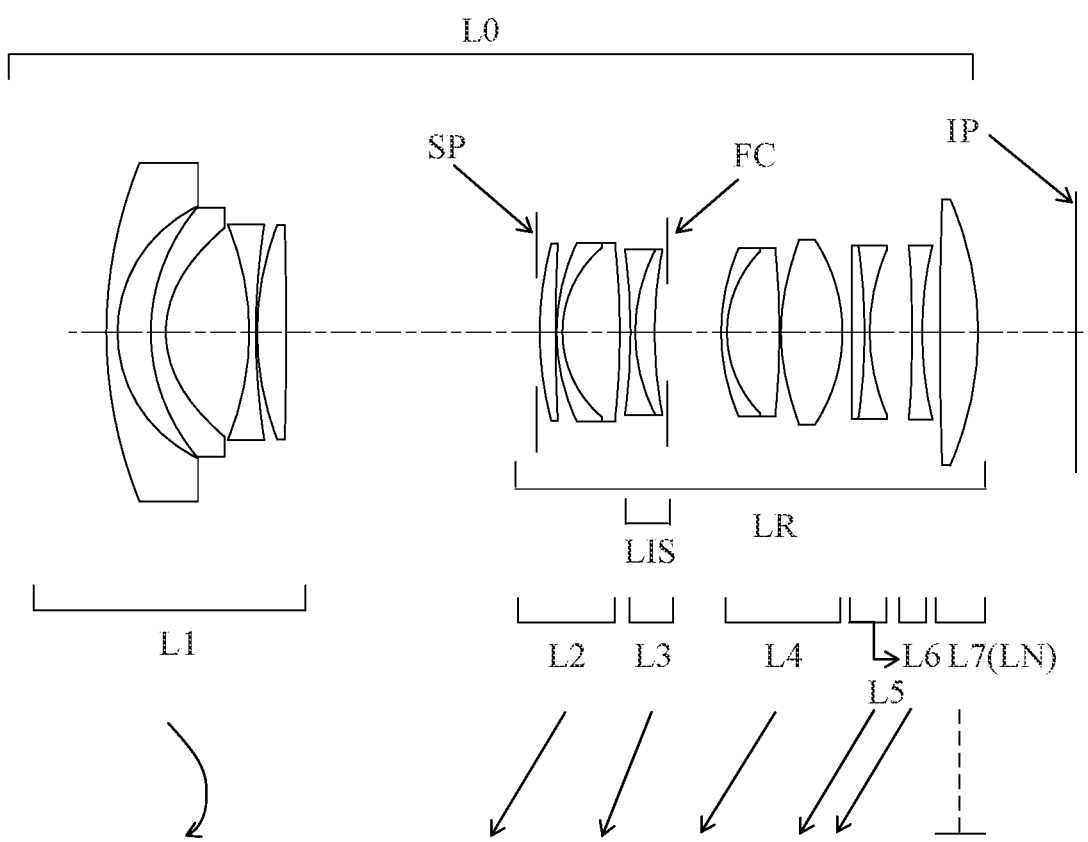
FIG. 10 is a sectional view of a zoom lens according to Example 4.
Figure 11A:
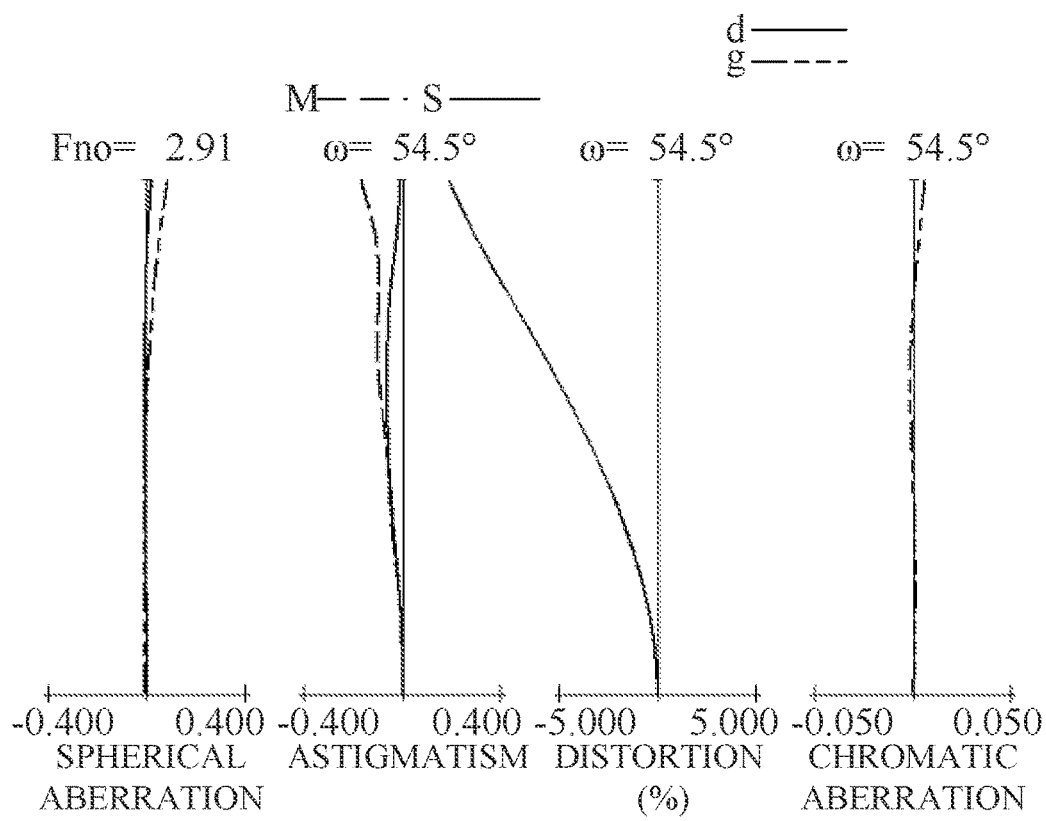
FIGS. 11A and 11B are longitudinal aberration diagrams of the zoom lens at the wide-angle end and at the telephoto end in Example 4, respectively.
Figure 11B:
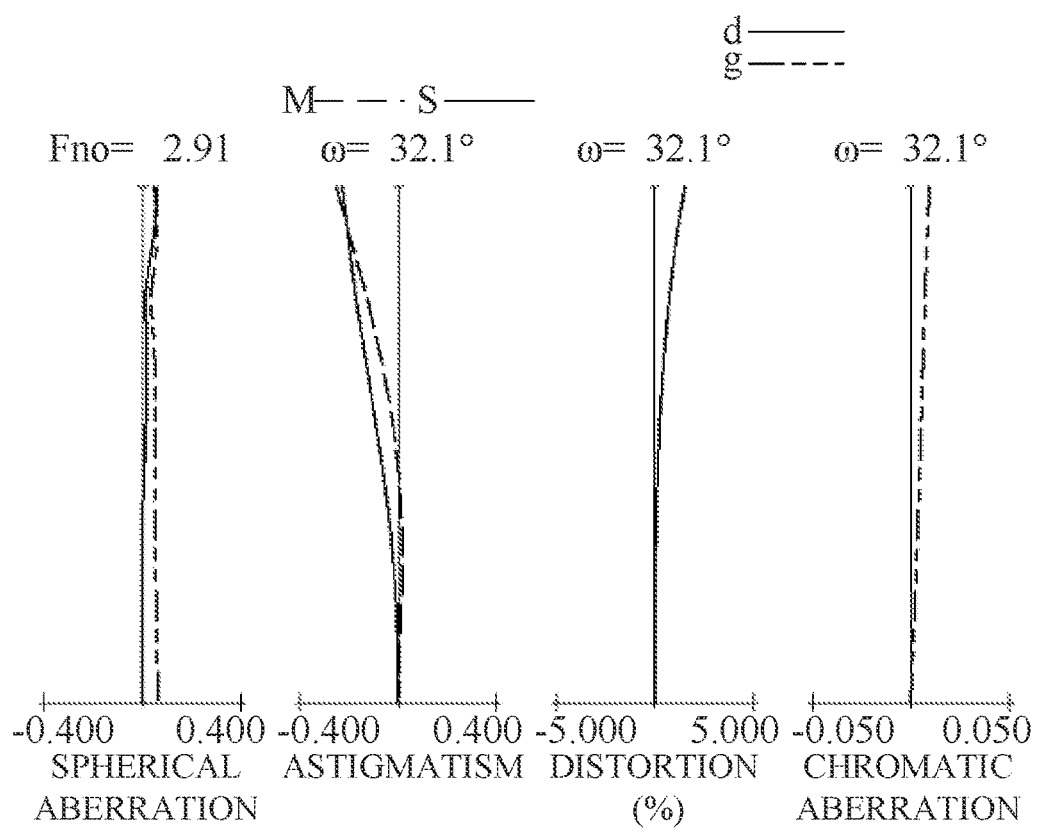
Figure 13:
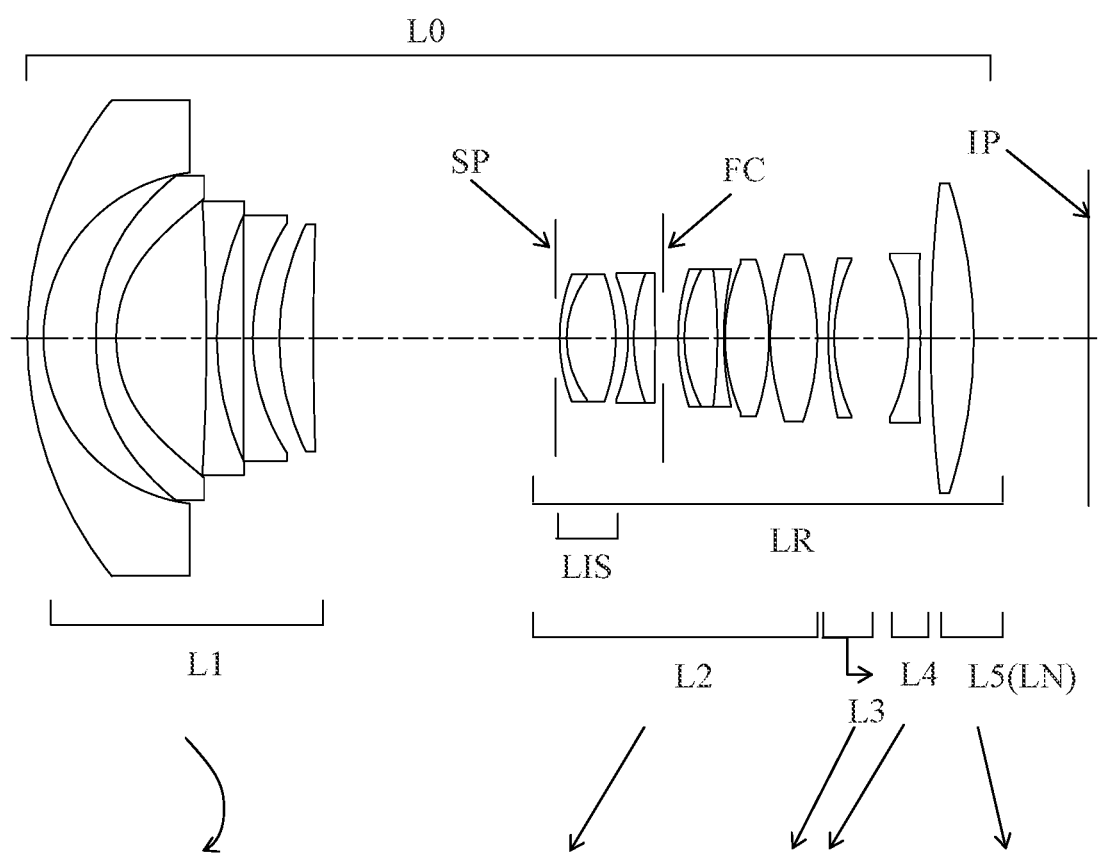
FIG. 13 is a sectional view of a zoom lens according to Example 5.
Figure 14A:
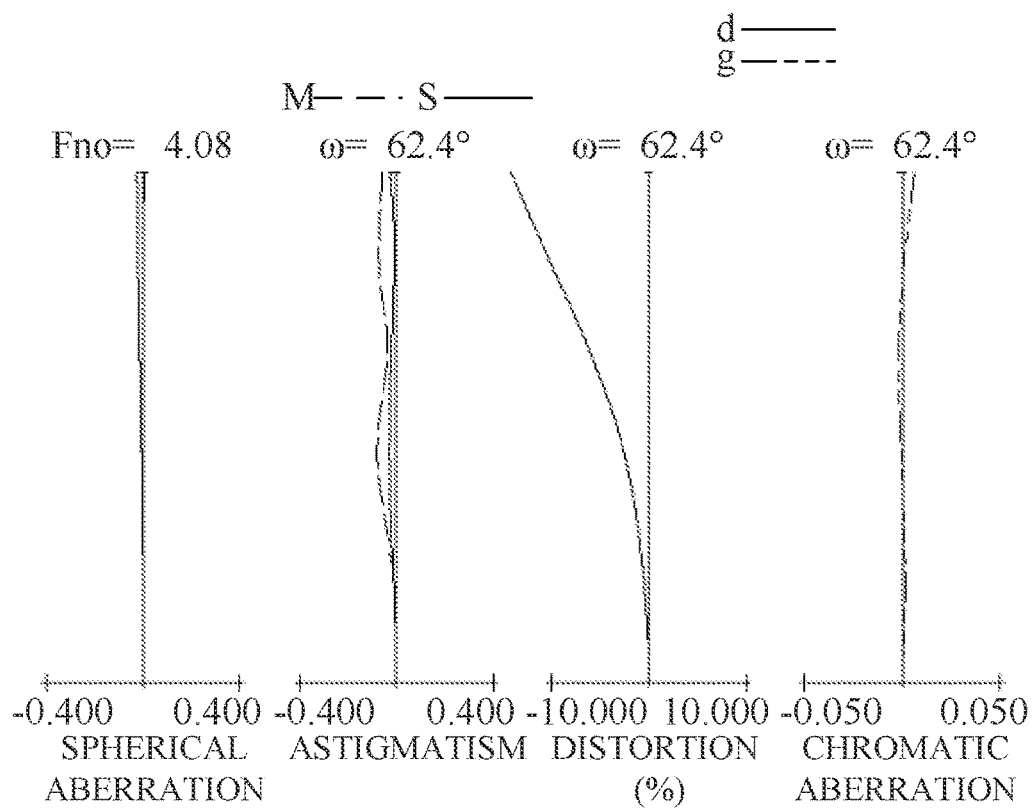
FIGS. 14A and 14B are longitudinal aberration diagrams of the zoom lens at the wide-angle end and at the telephoto end in Example 5, respectively.
Figure 14B:
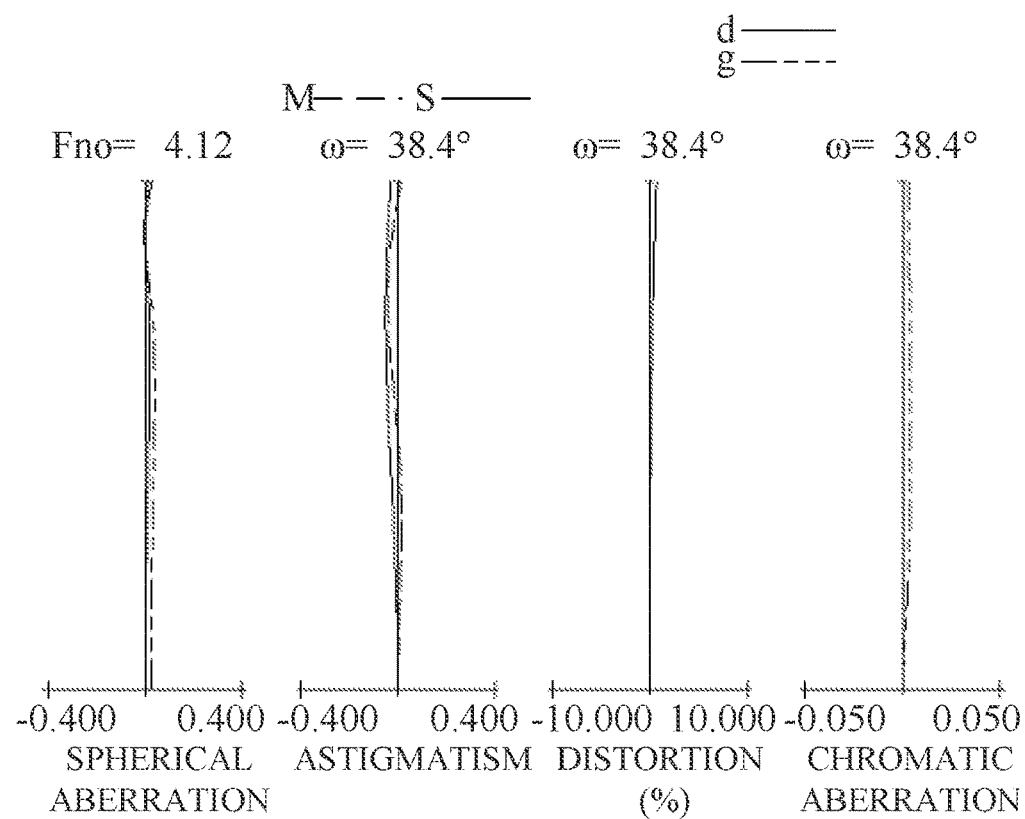
Figure 16:
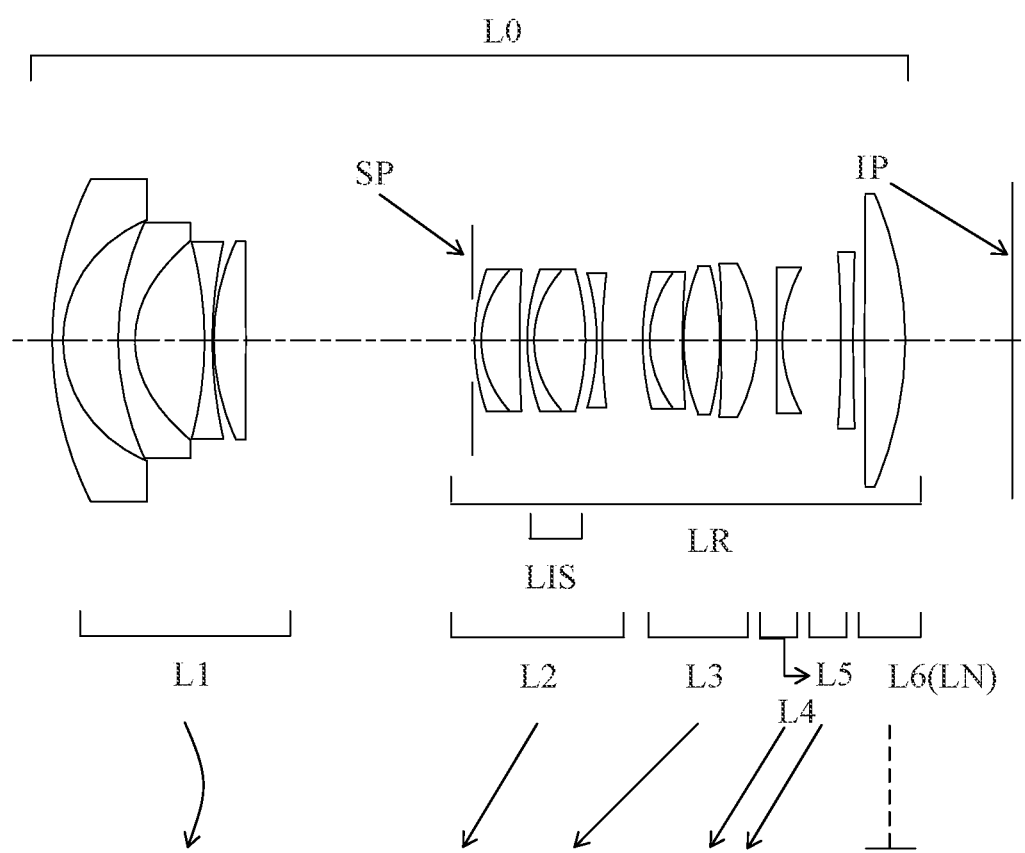
FIG. 16 is a sectional view of a zoom lens according to Example 6.
Figure 17A:
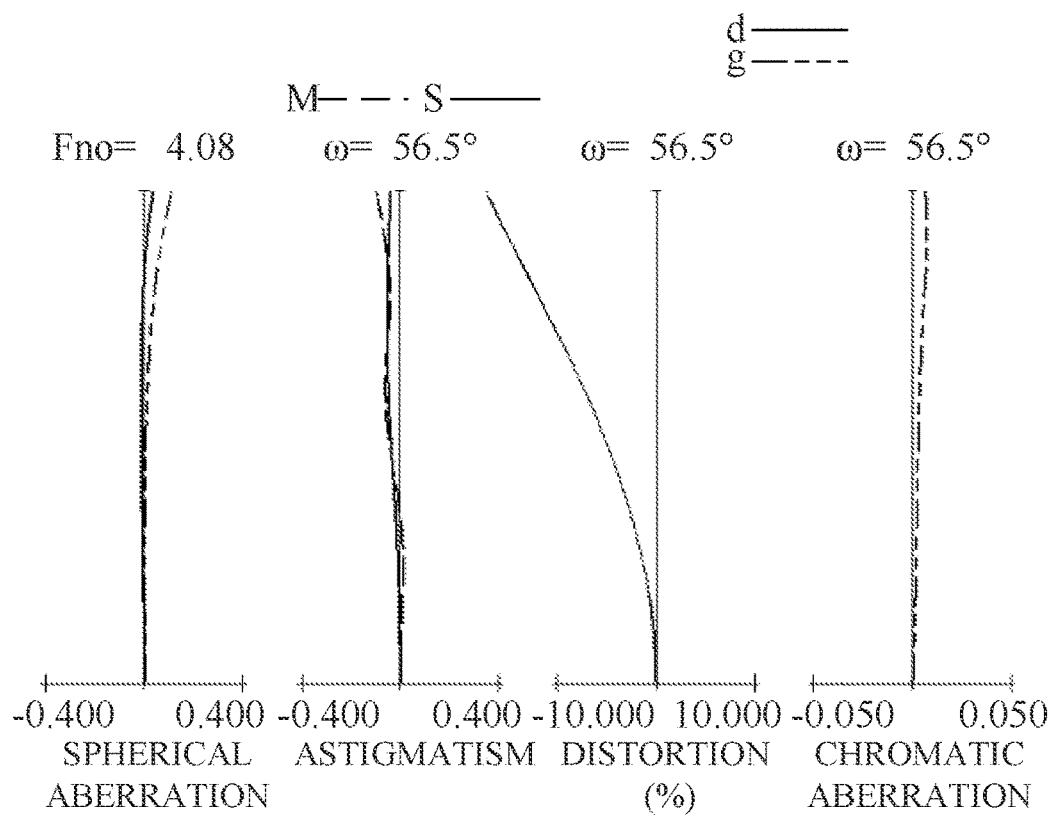
FIGS. 17A and 17B are longitudinal aberration diagrams of the zoom lens at the wide-angle end and at the telephoto end in Example 6, respectively.
Figure 17B:
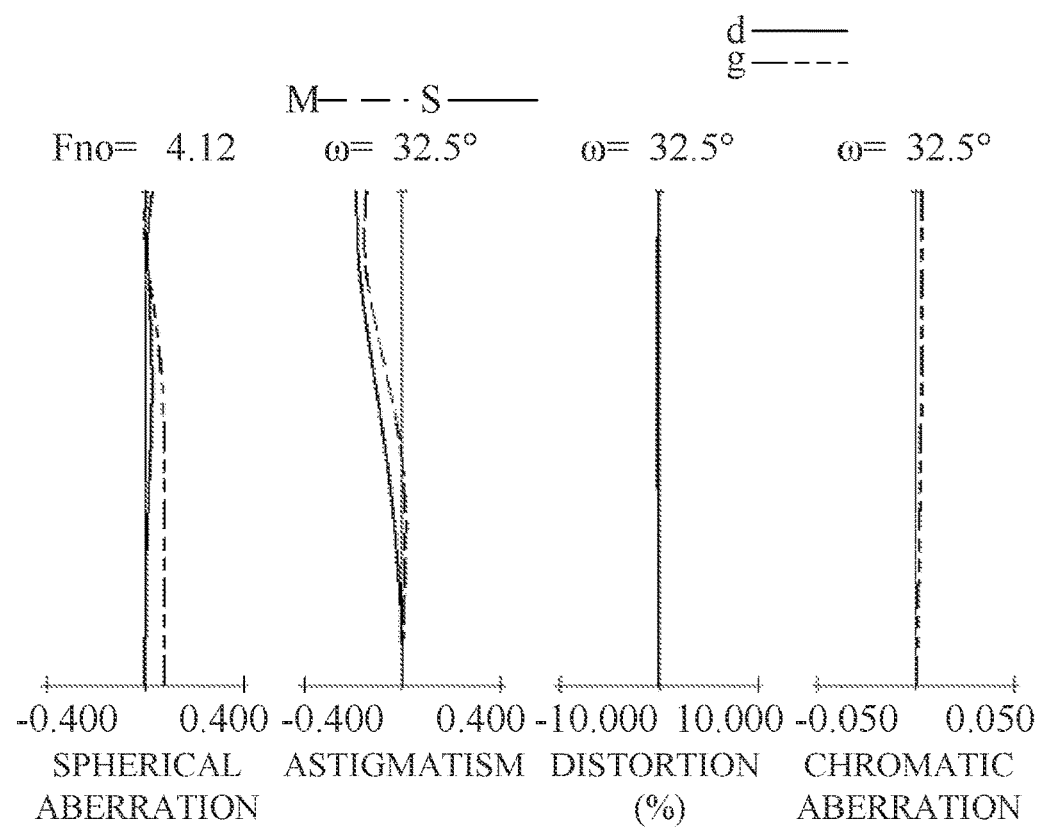
Figure 18A:
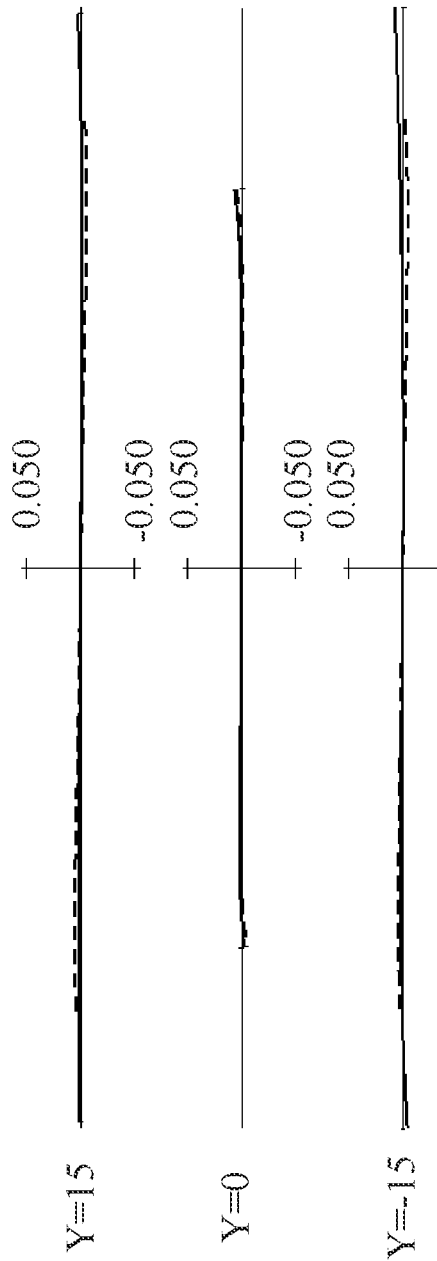
FIGS. 18A and 18B are lateral aberration diagrams of the zoom lens at the wide-angle end and at the telephoto end in the image stabilization in Example 6, respectively.
Figure 18B:
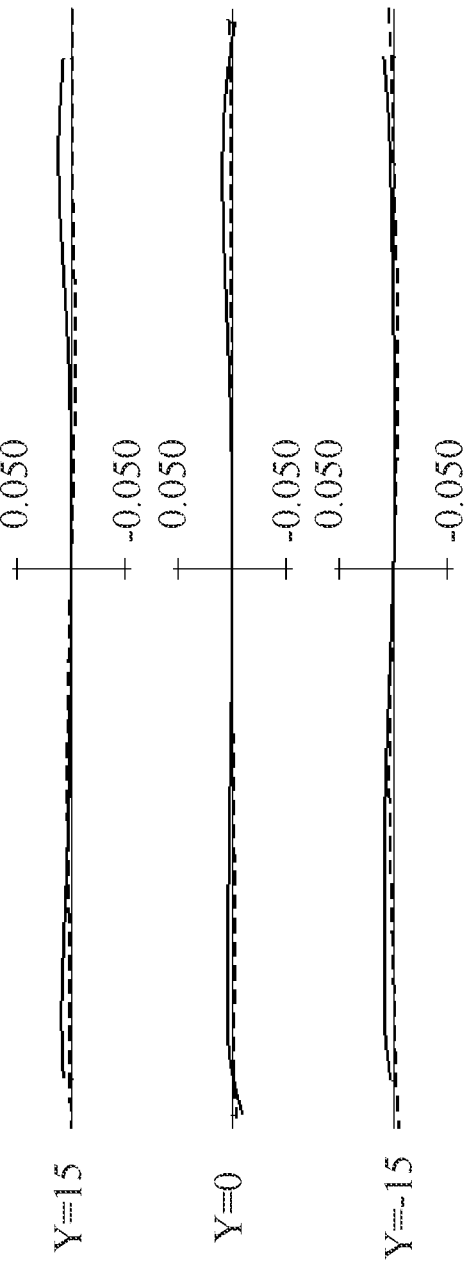
Figure 19:
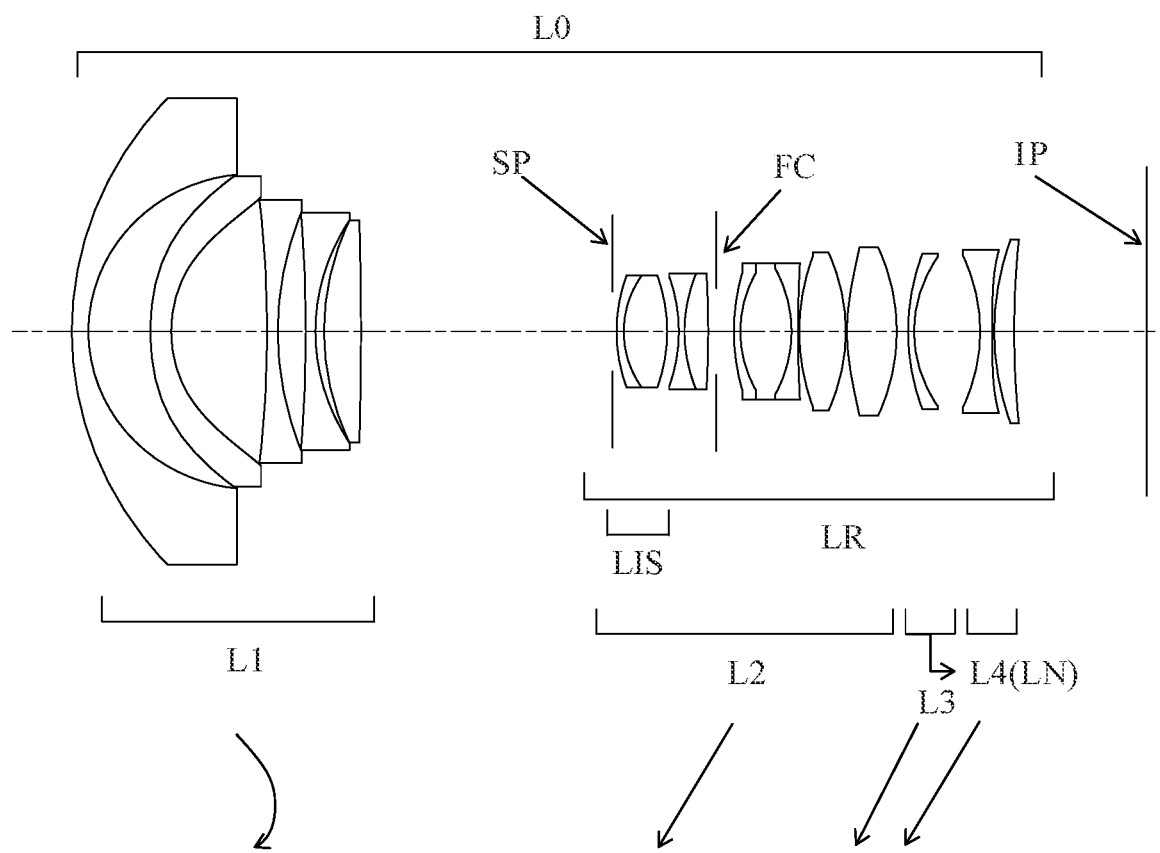
FIG. 19 is a sectional view of a zoom lens according to Example 7.
Figure 20A:
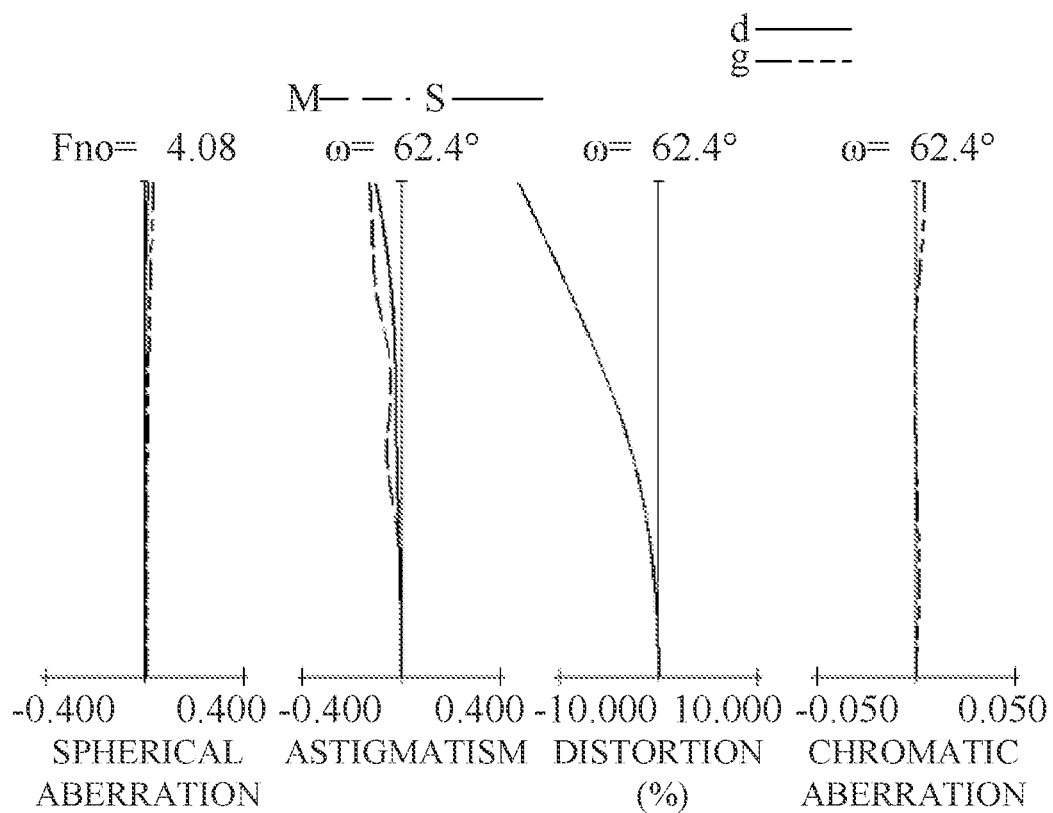
FIGS. 20A and 20B are longitudinal aberration diagrams of the zoom lens at the wide-angle end and at the telephoto end in Example 7, respectively.
Figure 20B:
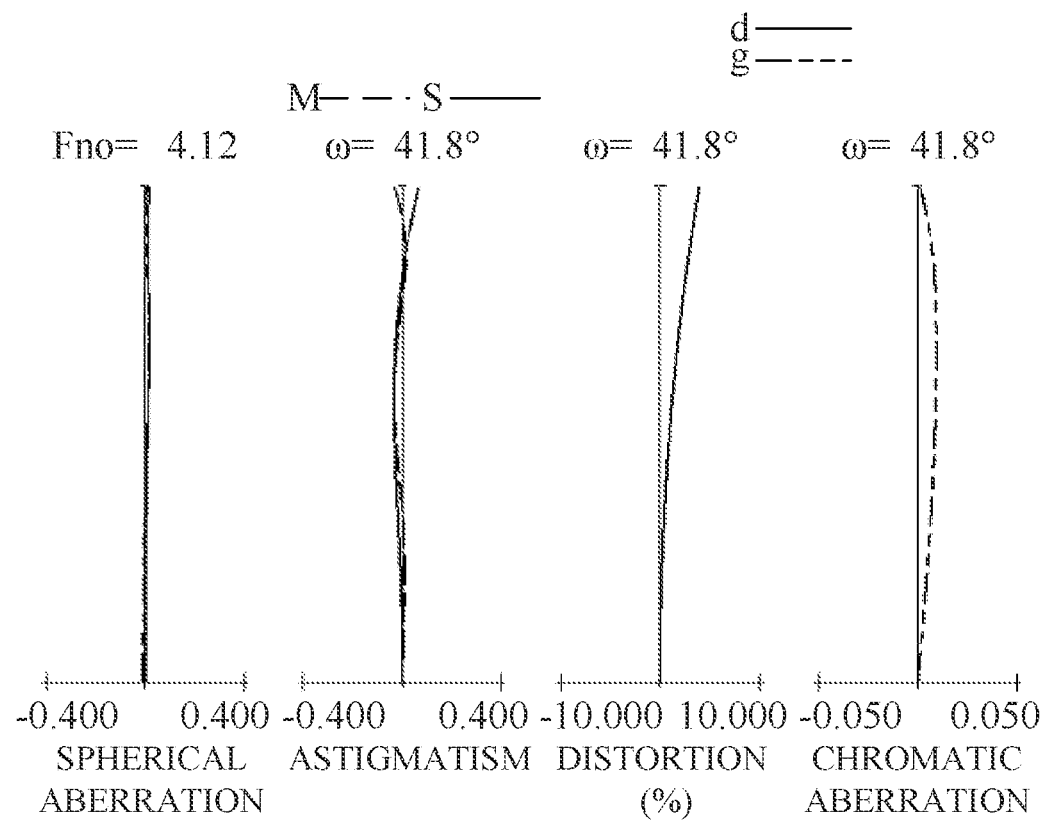

Referring now to the accompanying drawings, a detailed description will be given of embodiments according to the present invention. Corresponding elements in respective figures will be designated by the same reference numerals, and a duplicate description thereof will be omitted.

FIGS. 1, 4, 7, 10, 13, 16 and 19 are sectional views of zoom lenses L0 according to Examples 1 to 7 at a wide-angle end in an in-focus state at infinity, respectively. The zoom lens L0 according to each example is used for an image pickup apparatus such as a digital video camera, a digital still camera, a broadcasting camera, a silver salt film camera, a surveillance camera, and an in-vehicle camera. The zoom lens L0 according to each example is also applicable to a projection lens in a projector or the like.

In each sectional view, a left side is an object side (front), and a right side is an image side (rear). The zoom lens L0 according to each example includes a plurality of lens units. In this specification, a lens unit is a group of lenses that move or stand still integrally during zooming. That is, in the zoom lens L0 according to each example, a distance between adjacent lens units is changed during zooming. The lens unit includes one or more lenses. The lens unit may include elements other than a lens unit, such as a diaphragm (aperture stop).

The zoom lens L0 according to each example includes, in order from the object side to the image side, a first lens unit L1 having a negative refractive power, and a rear unit LR having a positive refractive power as a whole. The rear unit LR includes all lens units on the image side of the first lens unit L1. In the zoom lens L0 according to each example, a distance between the first lens unit L1 and the rear unit LR is changed during zooming.

In each sectional view, Li denotes an i-th lens unit (i is a natural number) counted from the object side among lens units included in the zoom lens L0. LN denotes a final lens unit closes to the image plane.

SP denotes a diaphragm (aperture stop). The diaphragm SP is provided on the object side or inside of the second lens unit L2. FC denotes a sub-diaphragm (auxiliary diaphragm). IP denotes an image plane, and when the zoom lens L0 according to each example is used as an imaging optical system for a digital still camera or a digital video camera, an imaging plane of a solid-state image sensor (photoelectric conversion element) such as a CCD sensor and a CMOS sensor is disposed there. When the zoom lens L0 according to each example is used as an imaging optical system for a film-based camera, a photosensitive plane corresponding to a film plane is placed on the image plane IP.

An arrow illustrated in the sectional view indicates a moving direction of the lens unit during zooming from the wide-angle end to the telephoto end or a moving direction of the lens unit during focusing from an infinity object to a short-distance object. In each example, a single lens unit is moved as a whole during focusing, but the present invention is not limited to this embodiment. During focusing, only part of the lens unit may be moved, or the entire zoom lens L0 may be moved. During focusing, the plurality of lenses may be moved in different trajectories.

FIGS. 2A, 2B, 5A, 5B, 8A, 8B, 11A, 11B, 14A, 14B, 17A, 17B, 20A, and 20B are longitudinal aberration diagrams of the zoom lenses L0 according to Examples 1 to 7, respectively. In each longitudinal aberration diagram, FIGS. 2A, 5A, 8A, 11A, 14A, 17A, and 20A are longitudinal aberration diagrams of the zoom lenses L0 at the wide-angle end, and FIGS. 2B, 5B, 8B, 11B, 14B, 17B, and 20B are longitudinal aberration diagrams of the zoom lenses L0 at the telephoto end. In the spherical aberration diagram, Fno denotes an F-number and indicates a spherical aberration amount for each of the d-line (wavelength 587.6 nm) and the g-line (wavelength 435.8 nm). In the astigmatism diagram, M denotes an astigmatism amount on a meridional image plane, and S denotes an astigmatism amount on a sagittal image plane. The distortion diagram illustrates a distortion amount for the d-line. The chromatic aberration diagram illustrates a chromatic aberration amount for the g-line. ω is a half imaging angle of view)(°.

FIGS. 3A, 3B, 6A, 6B, 9A, 9B, 12A, 12B, 15A, 15B, 18A, 18B, 21A, and 21B are lateral aberration diagrams of the zoom lens L0 according to each example during image stabilization by 0.3°. In each lateral aberration diagram, FIGS. 3A, 6A, 9A, 12A, 15A, 18A, and 21A are lateral aberration diagrams of the zoom lens L0 at the wide-angle end, and FIGS. 3B, 6B, 9B, 12B, 15B, 18B, and 21B are lateral aberration diagrams of the zoom lens L0 at the telephoto end. The unit of each axis is mm. Y is an image height (mm) made by evaluating the lateral aberration diagram.

Next follows a description of characteristic configurations of the zoom lens L1 according to each example.

The zoom lens L0 according to each example is a so-called negative lead type zoom lens in which the first lens unit L1 has a negative refractive power. The negative lead type zoom lens is known as an effective configuration for widening the angle of view of the zoom lens.

The rear unit LR includes a subunit (image stabilizing unit) LIS that moves in a direction having a component in a direction orthogonal to the optical axis during image stabilization. Thereby, a height of an off-axis light ray incident on the subunit LIS can be lowered, and the deterioration of the optical performance during the image stabilization can be suppressed. In this specification, the subunit is a group of lenses whose constituent length (distance on the optical axis from a lens surface closest to the object to a lens surface closest to the image plane in the subunit) does not change during zooming. The subunit may be a single lens unit or part of the single lens unit.

The first lens unit L1 includes, in order from the object side to the image side, three or more negative lenses. This configuration can secure a sufficiently wide angle of view (such as an angle of view of 100° or higher at the wide-angle end).

The zoom lens L0 according to each example satisfies the following inequalities (conditional expressions) (1) and (2).

$$-20 < \text{Dist\_w} < -8 \quad (1)$$

$$-0.4 < fl/fLN < 0.7 \quad (2)$$

where Dist_w is a distortion amount at a maximum image height in an in-focus state at infinity at the wide-angle end, fl is a focal length of the first lens unit L1, and fLN is a focal length of the final lens unit LN.

The inequality (1) defines a distortion amount of the maximum image height in the in-focus state at infinity at the wide-angle end. The maximum image height is a distance from the optical axis of an image point farthest from the optical axis among image points that can be imaged. If the distortion amount becomes excessively large beyond the upper limit in the inequality (1), a distortion amount in the equidistant projection method is too large, and the image quality in the periphery of the imaging plane significantly deteriorates during the image stabilization. Even in the lens shift image stabilization, an image stabilizing amount in the periphery of the imaging plane becomes insufficient. If the distortion amount becomes excessively small below the lower limit in the inequality (1), it becomes difficult to suppress the deterioration of the image quality in the periphery of the imaging plane during the electronic distortion correction.

The distortion amount Dist_w [%] at an arbitrary image height at the wide-angle end is defined by the following inequality:

$$\text{Dist\_w} \ [\%] = ((yp - y)/y) \times 100$$

where y is an ideal image height in the central projection method, and yp is a real image height.

The ideal image height y in the central projection method is defined by the following inequality:

$$y = f \cdot \tan\theta i$$

where f is a focal length of the zoom lens L0, and θi is a half angle of view of a real ray at the arbitrary image height.

The inequality (2) defines a ratio of the focal length of the first lens unit L1 to the focal length of the final lens unit LN. Satisfying the inequality (2) can achieve both the miniaturization and the high image quality. If the negative refractive power of the final lens unit LN becomes too strong beyond the upper limit in the inequality (2), and it becomes difficult to achieve the refractive power arrangement of the retrofocus and to widen the angle of view while ensuring the backfocus at the wide-angle end. If the positive refractive power of the final lens unit LN becomes too strong below the lower limit in the inequality (2), the refractive power arrangement of the retrofocus becomes strong, the asymmetry of the refractive power arrangement of the zoom lens L0 becomes remarkable, and it becomes difficult to correct the distortion at the wide-angle end. In addition, it becomes difficult to shorten the overall lens length of the zoom lens L0 (distance on the optical axis from the lens surface closest to the object to the image plane IP) at the wide-angle end.

Due to the above configuration, the zoom lens L0 according to each example can achieve both the wide angle of view and the miniaturization, and can maintain the high optical performance in the image stabilization.

The numerical ranges of the inequalities (1) and (2) may be replaced with those of the following inequalities (1a) and (2a):

$$-19 < \text{Dist\_w} < -9 \quad (1a)$$

$$-0.37 < fl/fLN < 0.60 \quad (2a)$$

The numerical ranges of inequalities (1) and (2) may be replaced with those of the following inequalities (1b) and (2b):

$$-18 < \text{Dist\_w} < -10 \quad (1b)$$

$$-0.34 < fl/fLN < 0.50 \quad (2b)$$

Next follows a description of conditions which the zoom lens L0 according to each example may satisfy. The zoom lens L0 according to each example may satisfy one or more of the following inequalities (3) to (11):

$$1.0 < |fLIS/ft| < 4.0 \quad (3)$$

$$0.00 \leq dIS/dt < 0.25 \quad (4)$$

$$0.1 < dLIS/dR < 10.0 \quad (5)$$

$$30 < vLIS < 70 \quad (6)$$

$$-1.0 < (r1 + r2)/(r1 - r2) < 0.6 \quad (7)$$

$$-2.2 < fl/skw < -0.9 \quad (8)$$

$$-2.2 < fl/fw < -1.0 \quad (9)$$

$$-0.5 < fw/fLN < 0.3 \quad (10)$$

$$-1.5 < \text{Ymax\_w}/fl < -0.4 \quad (11)$$

Here, fLIS is a focal length of the subunit LN. ft is a focal length of the zoom lens L0 at the telephoto end. dIS is a distance on the optical axis from a lens surface closest to the object in the rear unit LR to a lens surface closest to the object in the subunit LIS at the telephoto end. dt is an overall lens length of the zoom lens L0 at the telephoto end. dLIS is a distance on the optical axis from a lens surface closest to the object to a lens surface closest to the image plane in the subunit LIS. dR is a distance on the optical axis from a lens surface closest to the image plane in the subunit LIS to a lens surface closest to the object in a lens unit adjacent to and disposed on the image side of the subunit LIS at the wide-angle end. vLIS is an Abbe number of a lens having the shortest focal length in the subunit LIS. r1 is a radius of curvature of a lens surface closest to the object in the subunit LIS. r2 is a radius of curvature of a lens surface closest to the image plane in the subunit LIS. skw is a backfocus of the zoom lens L0 at the wide-angle end. fw is a focal length of the zoom lens L0 at the wide-angle end. Ymax_w is a maximum image height at the wide-angle end.

The inequality (3) defines a refractive power of the subunit LIS. Satisfying the inequality (3) can reduce the outer diameter of the lens and suppress the aberration fluctuation during the image stabilization. If the refractive power of the subunit LIS becomes too weak beyond the upper limit in the inequality (3), the moving amount of the subunit LIS during the image stabilization becomes too large, and it becomes difficult to reduce the outer diameter of the lens. If the refractive power of the subunit LIS becomes too strong below the lower limit in the inequality (3), it becomes difficult to suppress fluctuations in the coma and curvature of field during the image stabilization.

The inequality (4) defines a distance on the optical axis from a lens surface closest to the object in the rear unit LR to a lens surface closest to the object in the subunit LIS at the telephoto end. If the distance from the lens surface closest to the object in the rear unit LR to the lens surface closest to the object in the subunit LIS becomes too long beyond the upper limit in the inequality (4), it becomes difficult to suppress the fluctuation of the coma during the image stabilization. If the distance from the lens surface closest to the object in the rear unit LR to the lens surface closest to the object in the subunit LIS becomes too short below the lower limit in the inequality (4), it becomes difficult to properly arrange a driving unit that drives the subunit LIS or a driving unit that drives the diaphragm SP.

The inequality (5) defines a ratio of the thickness of the subunit LIS to an distance (interval) in the subsequent group LR. If the subunit LIS becomes too thick beyond the upper limit in the inequality (5), the subunit LIS becomes heavy, the driving unit becomes large, and it becomes difficult to reduce the outer diameter of the lens. If the subunit LIS becomes too thin below the lower limit in the inequality (5), it becomes difficult to properly set a radius of curvature of the subunit LIS, and it becomes difficult to suppress fluctuations of the coma and the curvature of field during the image stabilization.

The inequality (6) defines an Abbe number of the lens with the shortest focal length included in the subunit LIS. When the subunit LIS has a positive refractive power, the Abbe number of the positive lens is defined, and when the subunit LIS has a negative refractive power, the Abbe number of the negative lens is defined. If the Abbe number is higher than the upper limit in the inequality (6), the refractive index becomes small, and it becomes difficult to suppress fluctuations in the coma during the image stabilization. If the Abbe number is lower than the lower limit in the inequality (6), it becomes difficult to suppress the fluctuation of the lateral chromatic aberration during the image stabilization.

The inequality (7) defines a shape factor of the subunit LIS. If the value is higher the upper limit in the inequality (7) and the subunit LIS has a meniscus shape with a concave surface facing the image side, it becomes difficult to suppress the fluctuation of the curvature of field during the image stabilization. If the value is lower than the lower limit in the inequality (7) and the subunit LIS has a meniscus shape with a concave surface facing the object side, it becomes difficult to suppress the fluctuation of the coma during the image stabilization.

The inequality (8) defines a ratio of the backfocus of the zoom lens L0 to the focal length of the first lens unit L1 at the wide-angle end. If the negative refractive power of the first lens unit L1 becomes too strong beyond the upper limit in the conditional inequality (8), the asymmetry of the refractive power arrangement of the zoom lens L0 becomes remarkable, and it becomes difficult to correct the distortion at the wide-angle end. If the negative refractive power of the first lens unit L1 becomes too weak below the lower limit in the inequality (8), it becomes difficult to achieve a wide angle of view exceeding 100° at the wide-angle end. In addition, the diameter of the front lens becomes large, and the outer diameter of the lens becomes large.

The inequality (9) defines a focal length of the first lens unit L1. If the negative refractive power of the first lens unit L1 becomes too strong beyond the upper limit in the conditional inequality (9), the asymmetry of the refractive power arrangement of the zoom lens L0 becomes remarkable, and it becomes difficult to correct the distortion at the wide-angle end. If the refractive power of the first lens unit L1 becomes too weak below the lower limit in the inequality (9), it becomes difficult to achieve a wide angle of view exceeding 100° at the wide-angle end. In addition, the diameter of the front lens becomes large, and the outer diameter of the lens becomes large.

The inequality (10) defines a focal length of the final lens unit LN. If the positive refractive power of the final lens unit LN becomes too strong beyond the upper limit in the conditional inequality (10), the refractive power arrangement of the retrofocus becomes strong, the asymmetry of the aberration of the refractive power arrangement of the zoom lens L0 becomes remarkable, and it becomes difficult to correct the distortion at the wide-angle end. In addition, it becomes difficult to shorten the overall lens length at the wide-angle end. If the negative refractive power of the final lens unit LN becomes too strong below the lower limit in the inequality (10), and it becomes difficult to achieve the refractive power arrangement of the retrofocus and to widen the angle of view while ensuring the backfocus at the wide-angle end.

The inequality (11) defines a maximum image height that can be imaged at the wide-angle end. Satisfying the inequality (11) can make the zoom lens L0 smaller and lighter. If the maximum image height is too large beyond the upper limit, the light ray in a wider range than the desired angle of view will be imaged on the imaging plane, making excessively large the mechanical mechanism and optical system. As a result, it becomes difficult to reduce the size and weight of the zoom lens L0. If the maximum image height is too small below the lower limit, the angle of view will be narrower than the desired angle of view.

The numerical ranges of the inequalities (3) to (11) may be replaced with those of the following inequalities (3a) to (11a):

$$1 < |fLIS/ft| < 3.5 \tag{3a}$$

$$0.00 \le dIS/dt < 0.20 \tag{4a}$$

$$0.2 < dLIS/dR < 8.0 \tag{5a}$$

$$32 < vLIS < 68 \tag{6a}$$

$$-0.8 < (r1 + r2)/(r1 - r2) < 0.5 \tag{7a}$$

$$-2.1 < fl/skw < -1.0 \tag{8a}$$

$$-2.1 < fl/fw < -1.1 \tag{9a}$$

$$-0.40 < fw/fLN < 0.25 \tag{10a}$$

$$-1.4 < Ymax\_w/fl < -0.5 \tag{11a}$$

The numerical ranges of the inequalities (3) to (11) may be replaced with those of the following inequalities (3b) to (11b):

$$1.2 < |fLIS/ft| < 30 \quad (3b)$$

$$0.00 \le dIS/dt < 0.15 \quad (4b)$$

$$0.3 < dLIS/dR < 6.0 \quad (5b)$$

$$34 < vLIS < 66 \quad (6b)$$

$$-0.7 < (r1+r2)/(r1-r2) < 0.4 \quad (7b)$$

$$-2.0 < fl/skw < -11 \quad (8b)$$

$$-2.0 < fl/fw < -12 \quad (9b)$$

$$-0.30 < fw/fLN < 0.20 \quad (10b)$$

$$-1.3 < Ymax\_w/fl < -0.6 \quad (11b)$$

Next follows a description of a configuration that the zoom lens L0 according to each example may satisfy.

The subunit LIS may include a positive lens and a negative lens. This configuration can effectively suppress fluctuations of the lateral chromatic aberration and the curvature of field during the image stabilization.

The rear unit LR may be disposed on the image side of the subunit LIS and include two or more lens units whose distance changes during zooming. This configuration can realize a sufficient magnification variation ratio (such as twice) while ensuring a sufficient wide angle (such as an angle of view of 100° or higher at the wide-angle end).

The rear unit LR may be disposed on the image side of the subunit LIS and include a focus unit that is moved during focusing. The image stabilizing unit disposed near the diaphragm and the focus unit disposed near the image plane can suppress the aberration fluctuations during the image stabilization and the aberration fluctuation during focusing at the same time.

At the wide-angle end, a distance between the first lens unit L1 and the rear unit LR may be the largest among distances between lens units included in the zoom lens L0. This configuration can increase a change in the distance between the first lens unit L1 and the rear unit LR during zooming, and it becomes easy to secure the zoom ratio.

The first lens unit L1 may include a positive lens. This configuration can correct the chromatic aberration in the first lens unit L1, and can suppress the fluctuation of the chromatic aberration during zooming.

The zoom lens L0 may have a memory that stores distortion correction data for correcting the distortion. This configuration can make small the zoom lens L0.

A detailed description will now be given of the zoom lens L0 according to each example.

The zoom lens L0 according to Example 1 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a negative refractive power, a fourth lens unit L4 having a negative refractive power, and a fifth lens unit L5 having a positive refractive power. Part of the second lens unit L2 is a subunit LIS. The third lens unit L3 is a focus unit. The fifth lens unit L5 is a final lens unit LN. During zooming from the wide-angle end to the telephoto end, the first lens unit L1 is moved to the image side and then moved to the object side. The second lens unit L2 is moved toward the object while reducing a distance from the first lens unit L1. The third lens unit L3 moves toward the object while increasing a distance from the second lens unit L2. The fourth lens unit L4 moves toward the object while reducing a distance from the third lens unit L3. The fifth lens unit L5 moves to the object side while increasing a distance from the fourth lens unit L4, and then moved to the image side. During focusing from an infinity object to a short-distance object, the third lens unit L3 moves to the image side.

The zoom lens L0 according to Example 2 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power. The third lens unit L3 is a subunit LIS. The fifth lens unit L5 is a focus unit. The sixth lens unit L6 is a final lens unit LN. During zooming from the wide-angle end to the telephoto end, the first lens unit L1 is moved to the image side. The second lens unit L2 is moved toward the object while reducing a distance from the first lens unit L1. The third lens unit L3 is moved toward the object while reducing a distance from the second lens unit L2. The fourth lens unit L4 is moved toward the object while reducing a distance from the third lens unit L3. The fifth lens unit L5 is moved toward the object while increasing a distance from the fourth lens unit L4. The sixth lens unit L6 is moved toward the object while increasing a distance from the fifth lens unit L5. During focusing from an infinity object to a short-distance object, the fifth lens unit L5 is moved to the image side.

The zoom lens L0 according to Example 3 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a positive refractive power, a fourth lens unit L4 having a negative refractive power, a fifth lens unit L5 having a negative refractive power, and a sixth lens unit L6 having a positive refractive power. Part of the second lens unit L2 is a subunit LIS. The fourth lens unit L4 is a focus unit. The sixth lens unit L6 is a final lens unit LN. During zooming from the wide-angle end to the telephoto end, the first lens unit L1 is moved to the image side and then moved to the object side. The second lens unit L2 is moved toward the object while reducing a distance from the first lens unit L1. The third lens unit L3 is moved toward the object while reducing a distance from the second lens unit L2. The fourth lens unit L4 is moved toward the object while increasing a distance from the third lens unit L3. The fifth lens unit L5 is moved toward the object while reducing a distance from the fourth lens unit L4. The sixth lens unit L6 is fixed (immovable). During focusing from an infinity object to a short-distance object, the fourth lens unit L4 is moved to the image side.

The zoom lens L0 according to Example 4 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a negative refractive power, a fourth lens unit L4 having a positive refractive power, a fifth lens unit L5 having a negative refractive power, a sixth lens unit L6 having a negative refractive power, and a seventh lens unit L7 having a positive refractive power. The third lens unit L3 is a subunit LIS. The fifth lens unit L5 is a focus unit. The seventh lens unit L7 is the final lens unit LN. During zooming from the wide-angle end to the telephoto end, the first lens unit L1 is moved to the image side and then moved to the object side. The second lens unit L2 is moved toward the object while reducing a distance from the first lens unit L1. The third lens unit L3 is moved toward the object while increasing a distance from the second lens unit L2. The fourth lens unit L4 is moved toward the object while reducing a distance from the third lens unit L3. The fifth lens unit L5 is moved toward the object while increasing a distance from the fourth lens unit L4. The sixth lens unit L6 is moved toward the object while reducing a distance from the fifth lens unit L5. The seventh lens unit L7 is fixed. During focusing from an infinity object to a short-distance object, the fifth lens unit L5 is moved to the image side.

The zoom lens L0 according to Example 5 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a negative refractive power, a fourth lens unit L4 having a negative refractive power, and a fifth lens unit L5 having a positive refractive power. Part of the second lens unit L2 is a subunit LIS. The third lens unit L3 is a focus unit. The fifth lens unit L5 is a final lens unit LN. During zooming from the wide-angle end to the telephoto end, the first lens unit L1 is moved to the image side and then moved to the object side. The second lens unit L2 is moved toward the object while reducing a distance from the first lens unit L1. The third lens unit L3 moves toward the object while increasing a distance from the second lens unit L2. The fourth lens unit L4 is moved toward the object while reducing a distance from the third lens unit L3. The fifth lens unit L5 is moved to the image side while increasing a distance from the fourth lens unit L4. During focusing from an infinity object to a short-distance object, the third lens unit L3 is moved to the image side.

The zoom lens L0 according to Example 6 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a positive refractive power, a fourth lens unit L4 having a negative refractive power, a fifth lens unit L5 having a negative refractive power, and a sixth lens unit L6 having a positive refractive power. Part of the second lens unit L2 is a subunit LIS. The fourth lens unit L4 is a focus unit. The sixth lens unit L6 is a final lens unit LN. During zooming from the wide-angle end to the telephoto end, the first lens unit L1 is moved to the image side and then to the object side. The second lens unit L2 is moved toward the object while reducing a distance from the first lens unit L1. The third lens unit L3 is moved toward the object while reducing a distance from the second lens unit L2. The fourth lens unit L4 is moved toward the object while increasing a distance from the third lens unit L3. The fifth lens unit L5 is moved toward the object while reducing a distance from the fourth lens unit L4. The sixth lens unit L6 is fixed. During focusing from an infinity object to a short-distance object, the fourth lens unit L4 is moved to the image side.

The zoom lens according to Example 7 includes, in order from the object side to the image side, a first lens unit L1 having a negative refractive power, and a rear unit LR having a negative refractive power as a whole. The rear unit LR includes, in order from the object side to the image side, a second lens unit L2 having a positive refractive power, a third lens unit L3 having a negative refractive power, and a fourth lens unit L4 having a negative refractive power. Part of the second lens unit L2 is a subunit LIS. The third lens unit L3 is a focus unit. The fourth lens unit L4 is a final lens unit LN. During zooming from the wide-angle end to the telephoto end, the first lens unit L1 is moved to the image side and then moved to the object side. The second lens unit L2 is moved toward the object while reducing a distance from the first lens unit L1. The third lens unit L3 is moved toward the object while increasing a distance from the second lens unit L2. The fourth lens unit L4 is moved toward the object while reducing a distance from the third lens unit L3. During focusing from an infinity object to a short-distance object, the third lens unit L3 is moved to the image side.

Numerical examples 1 to 7 corresponding to Examples 1 to 7 will be illustrated below.

In the surface data in each numerical example, r denotes a radius of curvature of each optical surface, and d (mm) denotes an on-axis distance (distance on the optical axis) between an m-th surface and an (m+1)-th surface, where m is the number of a surface counted from the light incident side. nd denotes a refractive index of each optical element for the d-line, and νd denotes an Abbe number of an optical element. The Abbe number νd of a certain material is expressed as follows:

$$\nu d = (Nd - 1)/(NF - NC)$$

where Nd, NF, and NC are refractive indexes for the d-line (587.6 nm), F-line (486.1 nm), C-line (656.3 nm), and g-line (wavelength 435.8 nm) in the Fraunhofer lines.

In each numerical example, all values of d, a focal length (mm), an F-number, and a half angle of view (degree) are set when the zoom lens L0 according to each example focuses on an infinity object. A "backfocus" is a distance on the optical axis from the final lens surface (lens surface closest to the image plane) to a paraxial image plane and is converted into an air equivalent length. The "overall lens length" is a length obtained by adding the backfocus to a distance on the optical axis from the frontmost surface (lens surface closest to the object) to the final surface in the zoom lens L0. The "lens unit" may include one or more lenses.

If the optical surface is an aspherical surface, an asterisk * is attached to the right side of the surface number. The aspherical shape is expressed as follows:

$$X = (h^2/R)/[1+\{1-(1+K)(h/R)^2\}^{1/2}] + A4 \times h^4 + A6 \times h^6 + A8 \times h^8 + A10 \times h^{10} + A12 \times h^{12}$$

where X is a displacement amount from a surface apex in the optical axis direction, h is a height from the optical axis in the direction orthogonal to the optical axis, R is a paraxial radius of curvature, K is a conical constant, A4, A6, A8, A10, and A12 are aspherical coefficients of each order. "e±XX" in each aspherical coefficient means "×10$^{\pm XX}$."

Numerical Example 1

| UNIT: mm | | | | | |
|---|---|---|---|---|---|
| Surface Data | | | | | |
| Surface No. | r | d | nd | vd | Effective Diameter |
| 1 | 51.172 | 2.10 | 1.76385 | 48.5 | 60.00 |
| 2 | 22.116 | 5.35 | | | 41.92 |
| 3* | 43.332 | 2.60 | 1.58313 | 59.4 | 41.25 |
| 4* | 20.040 | 7.86 | | | 35.56 |
| 5 | 46.620 | 1.30 | 1.49700 | 81.5 | 35.20 |
| 6 | 20.811 | 8.63 | | | 30.19 |
| 7 | −72.638 | 1.20 | 1.43875 | 94.7 | 29.72 |
| 8 | 28.416 | 3.02 | | | 27.38 |
| 9 | 31.708 | 4.25 | 1.72047 | 34.7 | 27.20 |
| 10 | 299.251 | (Variable) | | | 26.57 |
| 11 (Diaphragm) | ∞ | 0.50 | | | 15.47 |
| 12 | 20.518 | 0.90 | 1.90043 | 37.4 | 16.09 |
| 13 | 14.081 | 5.42 | 1.51633 | 64.1 | 15.68 |
| 14 | −41.681 | 1.39 | | | 15.71 |
| 15 | −45.264 | 0.70 | 1.79952 | 42.2 | 15.44 |
| 16 | 17.644 | 2.65 | 2.00069 | 25.5 | 15.61 |
| 17 | 53.947 | 1.00 | | | 15.54 |
| 18 (Auxiliary Diaphragm) | ∞ | 1.25 | | | 15.63 |
| 19 | 18.253 | 0.80 | 1.95375 | 32.3 | 16.23 |
| 20 | 12.998 | 7.21 | 1.49700 | 81.5 | 15.66 |
| 21 | −21.295 | 0.80 | 1.72916 | 54.7 | 15.48 |
| 22 | 45.323 | 0.15 | | | 15.64 |
| 23 | 19.970 | 5.19 | 1.43875 | 94.7 | 17.39 |
| 24 | −54.434 | 0.15 | | | 18.22 |
| 25* | 29.740 | 4.95 | 1.49700 | 81.5 | 18.94 |
| 26* | −37.767 | (Variable) | | | 19.14 |
| 27 | 50.182 | 0.75 | 1.72916 | 54.7 | 18.86 |
| 28 | 26.486 | (Variable) | | | 18.54 |
| 29 | −18.815 | 1.50 | 1.85400 | 40.4 | 19.72 |
| 30* | −37.763 | (Variable) | | | 21.83 |
| 31 | −568.191 | 6.05 | 1.49700 | 81.5 | 36.04 |
| 32 | −38.524 | (Variable) | | | 37.01 |
| Image Plane | ∞ | | | | |

| ASPHERIC DATA |
|---|

3rd Surface

K = 0.00000e+000 A 4 = 7.52315e−005 A 6 = −2.85004e−007 A 8 = 8.08696e−010
A10 = −1.62370e−012 A12 = 2.19074e−015 A14 = −1.39196e−018
4th Surface K = −7.00172e−001 A 4 = 8.26202e−005 A 6 = −2.36130e−007 A 8 = −1.14795e−010
A10 = 2.29302e−012 A12 = −5.42273e−015 A14 = 3.67687e−018
25th Surface K = 0.00000e+000 A 4 = −4.19009e−005 A 6 = −1.88923e−007 A 8 = 2.54663e−009
A10 = −2.45675e−011 A12 = 1.85699e−013
26th Surface K = 0.00000e+000 A 4 = −3.92596e−006 A 6 = −2.00765e−007 A 8 = 4.34769e−009
A10 = −4.17031e−011 A12 = 2.70334e−013
30th Surface K = 0.00000e+000 A 4 = 3.55737e−005 A 6 = 8.04633e−008 A 8 = −5.06048e−011
A10 = −1.92129e−012 A12 = 1.00728e−014

| VARIOUS DATA ZOOM RATIO 2.06 | | | |
|---|---|---|---|
| | WIDE-ANGLE | MIDDLE | TELEPHOTO |
| Focal Length: | 11.33 | 17.56 | 23.30 |
| Fno: | 4.08 | 4.08 | 4.12 |
| Half Angle of View (°): | 59.63 | 50.70 | 42.88 |
| Image Height: | 19.33 | 21.64 | 21.64 |
| Overall lens length: | 135.40 | 127.26 | 130.90 |
| BF: | 13.63 | 16.01 | 14.26 |
| d10 | 31.08 | 13.08 | 6.86 |
| d26 | 1.40 | 2.76 | 3.05 |
| d28 | 10.82 | 9.46 | 9.16 |

-continued

| UNIT: mm | | | |
|---|---|---|---|
| d30 | 0.80 | 8.28 | 19.88 |
| d32 | 13.63 | 16.01 | 14.26 |

| Zoom Lens Unit Data | | |
|---|---|---|
| Lens Unit | Starting Surface | Focal Length |
| 1 | 1 | −19.57 |
| 2 | 11 | 24.55 |
| 3 | 27 | −77.97 |
| 4 | 29 | −45.57 |
| 5 | 31 | 82.84 |

Numerical Example 2

| UNIT: mm | | | | | |
|---|---|---|---|---|---|
| Surface Data | | | | | |
| Surface No. | r | d | nd | vd | Effective Diameter |
| 1 | 40.613 | 1.70 | 1.76385 | 48.5 | 51.00 |
| 2 | 19.325 | 5.42 | | | 36.63 |
| 3* | 31.250 | 2.30 | 1.58313 | 59.4 | 35.85 |
| 4* | 17.371 | 9.00 | | | 30.81 |
| 5 | 169.823 | 1.30 | 1.49700 | 81.5 | 30.26 |
| 6 | 27.182 | 6.81 | | | 26.85 |
| 7 | −204.838 | 1.20 | 1.43875 | 94.7 | 24.92 |
| 8 | 26.012 | 3.14 | 1.72047 | 34.7 | 23.15 |
| 9 | 72.443 | (Variable) | | | 22.50 |
| 10 | 31.749 | 2.47 | 1.54814 | 45.8 | 17.19 |
| 11 | ∞ | 0.50 | | | 17.35 |
| 12 (Diaphragm) | ∞ | 0.50 | | | 17.44 |
| 13 | 31.532 | 0.90 | 1.81554 | 44.4 | 17.78 |
| 14 | 14.990 | 5.80 | 1.51823 | 58.9 | 17.39 |
| 15 | −58.790 | (Variable) | | | 17.59 |
| 16 | −47.567 | 0.70 | 1.72047 | 34.7 | 17.56 |
| 17 | 45.836 | 1.70 | 2.00069 | 25.5 | 17.89 |
| 18 | 176.965 | 2.00 | | | 17.96 |
| 19 (Auxiliary Diaphragm) | ∞ | (Variable) | | | 18.37 |
| 20 | 36.570 | 0.90 | 1.83481 | 42.7 | 19.05 |
| 21 | 17.537 | 5.37 | 1.43875 | 94.7 | 19.41 |
| 22 | 169.591 | 0.20 | | | 21.16 |
| 23 | 29.382 | 8.39 | 1.43875 | 94.7 | 23.63 |
| 24 | −39.782 | 0.20 | | | 24.89 |
| 25* | 59.282 | 9.17 | 1.49700 | 81.5 | 25.50 |
| 26* | −31.136 | (Variable) | | | 25.39 |
| 27 | −91.656 | 1.50 | 2.00069 | 25.5 | 23.92 |
| 28 | −57.835 | 0.75 | 1.72047 | 34.7 | 23.84 |
| 29 | 43.358 | (Variable) | | | 23.25 |
| 30* | −27.441 | 1.60 | 1.85400 | 40.4 | 23.53 |
| 31* | −60.934 | 0.20 | | | 25.65 |
| 32 | 178.490 | 5.04 | 1.49700 | 81.5 | 27.62 |
| 33 | −37.343 | (Variable) | | | 28.73 |
| Image Plane | ∞ | | | | |

ASPHERIC DATA

3rd Surface

K = 0.00000e+000 A 4 = 6.49432e−005 A 6 = −2.09847e−007 A 8 = 3.22034e−010
A10 = −3.56124e−014 A12 = −2.65892e−016 A14 = −2.11568e−019

4th Surface

K = −5.81434e−001 A 4 = 7.42938e−005 A 6 = −8.59222e−008 A 8 = −1.56177e−009
A10 = 9.19947e−012 A12 = −2.30787e−014 A14 = 1.96904e−017

25th Surface

K = 0.00000e+000 A 4 = −1.13378e−005 A 6 = −4.96476e−009 A 8 = 3.96013e−011
A10 = 5.02938e−013 A12 = 1.73732e−015

-continued

| UNIT: mm |
|---|

26th Surface

K = 0.00000e+000 A 4 = −6.09923e−006 A 6 = 1.18821e−008 A 8 = 4.84539e−011
A10 = −6.24432e−014 A12 = 4.33687e−015
30th Surface K = 0.00000e+000 A 4 = −6.59258e−005 A 6 = 7.46300e−007 A 8 = −5.93573e−009
A10 = 2.94143e−011 A12 = −6.27604e−014
31st Surface K = 0.00000e+000 A 4 = −2.90274e−005 A 6 = 6.29498e−007 A 8 = −3.79841e−009
A10 = 1.47494e−011 A12 = −2.52922e−014

| VARIOUS DATA ZOOM RATIO 1.89 | | | |
|---|---|---|---|
| | WIDE-ANGLE | MIDDLE | TELEPHOTO |
| Focal Length: | 12.36 | 17.28 | 23.30 |
| Fno: | 2.91 | 2.91 | 2.91 |
| Half Angle of View (°): | 57.41 | 51.25 | 42.88 |
| Image Height: | 19.33 | 21.64 | 21.64 |
| Overall lens length: | 130.51 | 122.33 | 119.64 |
| BF: | 13.43 | 18.88 | 24.55 |
| d 9 | 22.59 | 9.36 | 1.00 |
| d15 | 1.81 | 1.40 | 1.40 |
| d19 | 5.47 | 3.28 | 1.30 |
| d26 | 1.40 | 3.02 | 5.40 |
| d29 | 7.03 | 7.60 | 7.20 |
| d33 | 13.43 | 18.88 | 24.55 |

| Zoom Lens Unit Data | | |
|---|---|---|
| Lens Unit | Starting Surface | Focal Length |
| 1 | 1 | −16.25 |
| 2 | 10 | 32.38 |
| 3 | 16 | −67.90 |
| 4 | 20 | 23.86 |
| 5 | 27 | −43.80 |
| 6 | 30 | 2124.22 |

Numerical Example 3

| UNIT: mm | | | | | |
|---|---|---|---|---|---|
| Surface Data | | | | | |
| Surface No. | r | d | nd | vd | Effective Diameter |
| 1 | 53.599 | 1.40 | 1.77250 | 49.6 | 43.82 |
| 2 | 18.113 | 5.22 | | | 32.21 |
| 3* | 22.075 | 2.20 | 1.58313 | 59.4 | 31.65 |
| 4* | 10.628 | 10.87 | | | 26.46 |
| 5 | −44.745 | 1.00 | 1.49700 | 81.5 | 26.19 |
| 6 | 57.018 | 0.20 | | | 25.97 |
| 7 | 34.464 | 5.00 | 1.83400 | 37.2 | 26.18 |
| 8 | −232.206 | (Variable) | | | 25.60 |
| 9 (Diaphragm) | ∞ | 0.30 | | | 18.03 |
| 10 | 28.190 | 0.90 | 1.95375 | 32.3 | 18.71 |
| 11 | 16.928 | 4.39 | 1.63980 | 34.5 | 18.37 |
| 12 | 92.174 | 0.15 | | | 18.46 |
| 13 | 22.781 | 0.90 | 1.91082 | 35.3 | 18.81 |
| 14 | 13.865 | 7.08 | 1.51633 | 64.1 | 18.09 |
| 15 | −77.716 | 1.33 | | | 18.16 |
| 16 | −101.166 | 0.70 | 1.72047 | 34.7 | 18.03 |
| 17 | 22.540 | 2.37 | 2.00069 | 25.5 | 18.09 |
| 18 | 52.661 | (Variable) | | | 17.96 |
| 19 | 27.758 | 0.90 | 1.80400 | 46.5 | 18.26 |
| 20 | 13.290 | 6.78 | 1.49700 | 81.5 | 17.64 |
| 21 | −85.129 | 0.20 | | | 17.86 |
| 22* | 31.208 | 6.99 | 1.49700 | 81.5 | 19.27 |
| 23* | −21.124 | (Variable) | | | 20.01 |

-continued

| UNIT: mm | | | | | |
|---|---|---|---|---|---|
| 24 | 97.737 | 0.75 | 1.80400 | 46.5 | 19.32 |
| 25 | 22.020 | (Variable) | | | 18.89 |
| 26* | −83.892 | 1.60 | 1.85400 | 40.4 | 21.10 |
| 27* | 1997.530 | (Variable) | | | 22.21 |
| 28 | −426.907 | 5.12 | 1.48749 | 70.2 | 38.12 |
| 29 | −49.575 | 14.99 | | | 38.85 |
| Image Plane | ∞ | | | | |

ASPHERIC DATA

3rd Surface

K = 0.00000e+000 A 4 = −4.03233e−005 A 6 = 2.84310e−007 A 8 = −1.85419e−009
A10 = 6.48125e−012 A12 = −1.22378e−014 A14 = 9.28892e−018

4th Surface

K = −5.60601e−001 A 4 = −6.16452e−005 A 6 = 2.38219e−007 A 8 = −1.71089e−009
A10 = −6.46493e−012 A12 = 6.50194e−014 A14 = −1.76965e−016

22nd Surface

K = 0.00000e+000 A 4 = −1.67837e−005 A 6 = −3.64843e−008 A 8 = 1.07618e−009
A10 = −1.24350e−011 A12 = 7.09601e−014

23rd Surface

K = 0.00000e+000 A 4 = 1.93177e−005 A 6 = −1.27575e−007 A 8 = 6.12378e−010
A10 = −8.15372e−012 A12 = 4.33482e−014

26th Surface

K = 0.00000e+000 A 4 = 2.55101e−005 A 6 = −2.64846e−007 A 8 = −4.54960e−010
A10 = 8.83199e−012 A12 = −3.33076e−014

27th Surface

K = 0.00000e+000 A 4 = 3.69079e−005 A 6 = −2.56285e−007 A 8 = 4.52183e−010
A10 = 1.47250e−012 A12 = −6.14678e−015

VARIOUS DATA
ZOOM RATIO 2.35

| | WIDE-ANGLE | MIDDLE | TELEPHOTO |
|---|---|---|---|
| Focal Length: | 14.42 | 24.42 | 33.95 |
| Fno: | 4.08 | 4.08 | 4.12 |
| Half Angle of View (°): | 53.26 | 41.34 | 32.50 |
| Image Height: | 19.32 | 21.64 | 21.64 |
| Overall lens length: | 125.87 | 118.34 | 125.87 |
| BF: | 14.99 | 14.99 | 14.99 |
| d 8 | 27.76 | 8.00 | 2.38 |
| d18 | 4.14 | 2.93 | 1.30 |
| d23 | 1.40 | 2.29 | 1.88 |
| d25 | 7.46 | 6.57 | 6.97 |
| d27 | 3.78 | 17.21 | 32.00 |

Zoom Lens Unit Data

| Lens Unit | Starting Surface | Focal Length |
|---|---|---|
| 1 | 1 | −22.94 |
| 2 | 9 | 62.86 |
| 3 | 19 | 21.50 |
| 4 | 24 | −35.51 |
| 5 | 26 | −94.24 |
| 6 | 28 | 114.54 |

Numerical Example 4

| UNIT: mm | | | | | |
|---|---|---|---|---|---|
| Surface Data | | | | | |
| Surface No. | r | d | nd | vd | Effective Diameter |
| 1 | 69.215 | 1.70 | 1.76385 | 48.5 | 50.85 |
| 2 | 21.428 | 5.17 | | | 37.62 |
| 3* | 31.249 | 2.30 | 1.58313 | 59.4 | 37.18 |

-continued

| UNIT: mm | | | | | |
|---|---|---|---|---|---|
| 4* | 15.909 | 12.89 | | | 32.33 |
| 5 | −42.876 | 1.00 | 1.43875 | 94.7 | 31.99 |
| 6 | 106.477 | 0.20 | | | 31.70 |
| 7 | 45.553 | 4.49 | 1.83400 | 37.2 | 31.79 |
| 8 | −634.660 | (Variable) | | | 31.36 |
| 9 (Diaphragm) | ∞ | (Variable) | | | 23.60 |
| 10 | 52.261 | 2.46 | 1.72916 | 54.7 | 26.10 |
| 11 | 263.265 | 0.15 | | | 26.10 |
| 12 | 31.910 | 0.90 | 1.95375 | 32.3 | 26.30 |
| 13 | 17.077 | 8.89 | 1.58267 | 46.4 | 24.93 |
| 14 | −117.291 | (Variable) | | | 24.86 |
| 15 | −91.733 | 0.70 | 1.72047 | 34.7 | 24.27 |
| 16 | 27.559 | 2.96 | 2.00069 | 25.5 | 24.34 |
| 17 | 64.329 | 2.00 | | | 24.19 |
| 18 (Auxiliary Diaphragm) | ∞ | (Variable) | | | 24.31 |
| 19 | 32.406 | 0.90 | 1.83481 | 42.7 | 24.83 |
| 20 | 17.852 | 8.12 | 1.43875 | 94.7 | 23.93 |
| 21 | −123.183 | 0.20 | | | 24.22 |
| 22* | 33.004 | 9.54 | 1.49700 | 81.5 | 26.54 |
| 23* | −23.827 | (Variable) | | | 27.20 |
| 24 | 4131.745 | 2.01 | 2.00069 | 25.5 | 25.45 |
| 25 | −88.248 | 0.75 | 1.72047 | 34.7 | 25.27 |
| 26 | 31.864 | (Variable) | | | 24.27 |
| 27* | −166.689 | 1.60 | 1.85400 | 40.4 | 24.90 |
| 28* | 82.150 | (Variable) | | | 25.59 |
| 29 | 595.501 | 5.92 | 1.49700 | 81.5 | 39.14 |
| 30 | −50.768 | 15.11 | | | 39.80 |
| Image Plane | ∞ | | | | |

ASPHERIC DATA

3rd Surface

K = 0.00000e+000 A 4 = 1.41959e−005 A 6 = −7.81904e−008 A 8 = 3.46364e−010
A10 = −1.01509e−012 A12 = 1.45953e−015 A14 = −7.30050e−019

4th Surface

K = −6.36442e−001 A 4 = 1.55368e−005 A 6 = −1.12080e−007 A 8 = 5.29838e−010
A10 = −1.99889e−012 A12 = 2.59583e−015 A14 = −2.64013e−019

22nd Surface

K = 0.00000e+000 A 4 = −6.99798e−006 A 6 = −1.13680e−008 A 8 = 1.53877e−011
A10 = −1.10382e−013 A12 = −4.97644e−016

23rd Surface

K = 0.00000e+000 A 4 = 2.44559e−005 A 6 = −8.82874e−008 A 8 = 1.95669e−010
A10 = −1.85265e−013 A12 = −1.18827e−015

27th Surface

K = 0.00000e+000 A 4 = 5.05507e−005 A 6 = −7.34842e−007 A 8 = 4.77038e−009
A10 = −1.90408e−011 A12 = 3.62227e−014

28th Surface

K = 0.00000e+000 A 4 = 5.77402e−005 A 6 = −6.55664e−007 A 8 = 4.27445e−009
A10 = −1.57305e−011 A12 = 2.69924e−014

VARIOUS DATA
ZOOM RATIO 2.20

| | WIDE-ANGLE | MIDDLE | TELEPHOTO |
|---|---|---|---|
| Focal Length: | 15.45 | 25.03 | 33.95 |
| Fno: | 2.91 | 2.91 | 2.91 |
| Half Angle of View (°): | 51.37 | 40.70 | 32.51 |
| Image Height: | 19.33 | 21.64 | 21.64 |
| Overall lens length: | 149.62 | 134.58 | 135.96 |
| BF: | 15.11 | 15.11 | 15.11 |
| d 8 | 38.59 | 12.29 | 2.42 |
| d 9 | 0.50 | 3.59 | 4.63 |
| d14 | 1.64 | 3.26 | 3.73 |
| d18 | 8.30 | 3.20 | 1.30 |
| d23 | 1.40 | 1.44 | 2.33 |
| d26 | 6.53 | 8.68 | 6.05 |
| d28 | 2.71 | 12.16 | 25.54 |

-continued

| UNIT: mm | | |
|---|---|---|
| Zoom Lens Unit Data | | |
| Lens Unit | Starting Surface | Focal Length |
| 1 | 1 | −28.99 |
| 2 | 9 | ∞ |
| 3 | 10 | 41.93 |
| 4 | 15 | −75.73 |
| 5 | 19 | 25.63 |
| 6 | 24 | −52.21 |
| 7 | 27 | −64.25 |
| 8 | 29 | 94.41 |

Numerical Example 5

| UNIT: mm | | | | | |
|---|---|---|---|---|---|
| Surface Data | | | | | |
| Surface No. | r | d | nd | vd | Effective Diameter |
| 1 | 48.538 | 2.10 | 1.76385 | 48.5 | 60.00 |
| 2 | 21.514 | 6.80 | | | 41.40 |
| 3* | 41.518 | 2.60 | 1.58313 | 59.4 | 40.59 |
| 4* | 19.615 | 11.68 | | | 34.73 |
| 5 | −272.695 | 1.30 | 1.49700 | 81.5 | 34.04 |
| 6 | 37.773 | 3.45 | | | 30.53 |
| 7 | −13097.059 | 1.20 | 1.43875 | 94.7 | 30.39 |
| 8 | 26.973 | 3.42 | | | 28.26 |
| 9 | 32.744 | 4.40 | 1.72047 | 34.7 | 28.06 |
| 10 | 377.895 | (Variable) | | | 27.42 |
| 11 (Diaphragm) | ∞ | 0.50 | | | 14.70 |
| 12 | 22.168 | 0.90 | 1.88300 | 40.8 | 15.20 |
| 13 | 13.223 | 6.36 | 1.51633 | 64.1 | 14.83 |
| 14 | −23.367 | 1.60 | | | 15.03 |
| 15 | −20.976 | 0.70 | 1.83481 | 42.7 | 14.66 |
| 16 | 23.672 | 2.79 | 2.00069 | 25.5 | 15.34 |
| 17 | −426.850 | 1.00 | | | 15.52 |
| 18 (Auxiliary Diaphragm) | ∞ | 1.95 | | | 15.76 |
| 19 | 28.067 | 0.80 | 2.05090 | 26.9 | 16.47 |
| 20 | 18.874 | 4.30 | 1.49700 | 81.5 | 16.18 |
| 21 | −68.734 | 0.80 | 1.75500 | 52.3 | 16.31 |
| 22 | 41.203 | 0.15 | | | 16.50 |
| 23 | 23.795 | 5.71 | 1.43875 | 94.7 | 17.89 |
| 24 | −30.878 | 0.15 | | | 19.00 |
| 25* | 26.669 | 6.09 | 1.49700 | 81.5 | 20.24 |
| 26 | −31.980 | (Variable) | | | 20.40 |
| 27 | 43.537 | 0.75 | 1.72916 | 54.7 | 19.36 |
| 28 | 23.468 | (Variable) | | | 18.81 |
| 29 | −22.555 | 1.50 | 1.85400 | 40.4 | 19.05 |
| 30* | −92.996 | (Variable) | | | 20.61 |
| 31 | 167.684 | 5.58 | 1.49700 | 81.5 | 37.93 |
| 32 | −64.072 | (Variable) | | | 38.64 |
| Image Plane | ∞ | | | | |

| ASPHERIC DATA |
|---|

3rd Surface

K = 0.00000e+000 A 4 = 6.47302e−005 A 6 = −2.29202e−007 A 8 = 5.86104e−010
A10 = −1.05964e−012 A12 = 1.37744e−015 A14 = −8.86881e−019
4th Surface K = −7.50843e−001 A 4 = 7.46936e−005 A 6 = −1.82700e−007 A 8 = −2.68916e−010
A10 = 2.54737e−012 A12 = −5.55262e−015 A14 = 3.33412e−018
25th Surface K = 0.00000e+000 A 4 = −2.23064e−005 A 6 = −6.28235e−008 A 8 = 7.24431e−011
A10 = −1.42742e−012 A12 = −7.58488e−016
30th Surface K = 0.00000e+000 A 4 = 3.94581e−005 A 6 = 6.47504e−008 A 8 = −2.02428e−010
A10 = 4.29810e−014 A12 = 3.69126e−015

| UNIT: mm | | | |
|---|---|---|---|
| VARIOUS DATA ZOOM RATIO 2.06 | | | |
| | WIDE-ANGLE | MIDDLE | TELEPHOTO |
| Focal Length: | 11.33 | 17.14 | 23.30 |
| Fno: | 4.08 | 4.08 | 4.12 |
| Half Angle of View (°): | 50.56 | 47.28 | 32.77 |
| Image Height: | 18.57 | 21.64 | 21.64 |
| Overall lens length: | 137.09 | 129.80 | 130.30 |
| BF: | 14.83 | 12.87 | 11.38 |
| d10 | 31.31 | 14.87 | 6.22 |
| d26 | 1.40 | 2.08 | 2.59 |
| d28 | 9.65 | 8.97 | 8.46 |
| d30 | 1.34 | 12.44 | 23.09 |
| d32 | 14.83 | 12.87 | 11.38 |
| Zoom Lens Unit Data | | | |
| Lens Unit | Starting Surface | | Focal Length |
| 1 | 1 | | −21.13 |
| 2 | 11 | | 22.34 |
| 3 | 27 | | −70.94 |
| 4 | 29 | | −35.21 |
| 5 | 31 | | 94.03 |

Numerical Example 6

| UNIT: mm | | | | | |
|---|---|---|---|---|---|
| Surface Data | | | | | |
| Surface No. | r | d | nd | vd | Effective Diameter |
| 1 | 50.865 | 1.40 | 1.77250 | 49.6 | 42.93 |
| 2 | 17.863 | 7.25 | | | 31.67 |
| 3* | 46.917 | 2.20 | 1.58313 | 59.4 | 30.93 |
| 4* | 14.743 | 9.13 | | | 26.03 |
| 5 | −53.512 | 1.00 | 1.49700 | 81.5 | 25.74 |
| 6 | 62.328 | 0.20 | | | 25.62 |
| 7 | 33.031 | 4.22 | 1.83400 | 37.2 | 25.87 |
| 8 | −1410.574 | (Variable) | | | 25.42 |
| 9 (Diaphragm) | ∞ | 0.30 | | | 17.61 |
| 10 | 30.753 | 0.90 | 1.95375 | 32.3 | 18.21 |
| 11 | 14.405 | 5.01 | 1.76200 | 40.1 | 17.88 |
| 12 | 178.071 | 1.00 | | | 17.95 |
| 13 | 28.952 | 0.90 | 1.72916 | 54.7 | 18.24 |
| 14 | 14.470 | 6.76 | 1.51633 | 64.1 | 17.75 |
| 15 | −34.922 | 1.48 | | | 17.69 |
| 16 | −34.130 | 0.70 | 1.55963 | 61.2 | 17.22 |
| 17 | 75.243 | (Variable) | | | 17.21 |
| 18 | 37.725 | 0.90 | 1.80400 | 46.5 | 17.53 |
| 19 | 15.470 | 4.31 | 1.49700 | 81.5 | 17.17 |
| 20 | 110.900 | 0.15 | | | 17.36 |
| 21 | 26.976 | 4.77 | 1.49700 | 81.5 | 18.66 |
| 22 | −40.410 | 0.15 | | | 19.20 |
| 23* | 217.132 | 4.72 | 1.49700 | 81.5 | 19.39 |
| 24* | −22.828 | (Variable) | | | 19.86 |
| 25 | −76007.456 | 0.75 | 1.80400 | 46.5 | 18.82 |
| 26 | 20.698 | (Variable) | | | 18.48 |
| 27* | −170.981 | 1.60 | 1.85400 | 40.4 | 21.99 |
| 28* | 998.468 | (Variable) | | | 22.94 |
| 29 | 2090.313 | 5.34 | 1.49700 | 81.5 | 38.25 |
| 30 | −51.796 | 14.02 | | | 38.93 |
| Image Plane | ∞ | | | | |

-continued

| UNIT: mm |
| --- |
| ASPHERIC DATA |

3rd Surface

K = 0.00000e+000 A 4 = 4.47960e−005 A 6 = −3.48481e−007 A 8 = 1.44040e−009
A10 = −3.42659e−012 A12 = 4.42059e−015 A14 = −2.38393e−018

4th Surface

K = −6.48193e−001 A 4 = 5.35870e−005 A 6 = −3.21360e−007 A 8 = −3.48686e−010
A10 = 1.17717e−011 A12 = −5.28294e−014 A14 = 7.55482e−017

23rd Surface

K = 0.00000e+000 A 4 = −4.71833e−005 A 6 = −8.44077e−008 A 8 = 1.47111e−009
A10 = −1.06774e−011 A12 = 7.11865e−014

24th Surface

K = 0.00000e+000 A 4 = −7.69334e−006 A 6 = −6.90014e−008 A 8 = 1.57448e−009
A10 = −1.47829e−011 A12 = 8.11251e−014

27th Surface

K = 0.00000e+000 A 4 = 1.74890e−006 A 6 = −3.81796e−009 A 8 = 1.07601e−009
A10 = −1.19626e−011 A12 = 2.22566e−014

28th Surface

K = 0.00000e+000 A 4 = 9.96899e−006 A 6 = −2.31241e−008 A 8 = 1.03976e−009
A10 = −1.09841e−011 A12 = 2.47861e−014

| VARIOUS DATA ZOOM RATIO 2.35 | | | |
| --- | --- | --- | --- |
|  | WIDE-ANGLE | MIDDLE | TELEPHOTO |
| Focal Length: | 14.42 | 23.99 | 33.95 |
| Fno: | 4.08 | 4.08 | 4.12 |
| Half Angle of View (°): | 46.13 | 32.01 | 23.84 |
| Image Height: | 17.92 | 21.64 | 21.64 |
| Overall lens length: | 125.86 | 115.15 | 121.59 |
| BF: | 14.02 | 14.02 | 14.02 |
| d 8 | 29.65 | 8.75 | 2.71 |
| d17 | 5.30 | 4.07 | 2.19 |
| d24 | 2.53 | 3.95 | 3.78 |
| d26 | 7.71 | 6.29 | 6.46 |
| d28 | 1.50 | 12.92 | 27.28 |

| Zoom Lens Unit Data | | |
| --- | --- | --- |
| Lens Unit | Starting Surface | Focal Length |
| 1 | 1 | −22.76 |
| 2 | 9 | 55.69 |
| 3 | 18 | 21.12 |
| 4 | 25 | −25.74 |
| 5 | 27 | −170.83 |
| 6 | 29 | 101.78 |

Numerical Example 7

| UNIT: mm | | | | | |
| --- | --- | --- | --- | --- | --- |
| Surface Data | | | | | |
| Surface No. | r | d | nd | vd | Effective Diameter |
| 1 | 45.081 | 2.10 | 1.76385 | 48.5 | 60.00 |
| 2 | 20.763 | 7.83 | | | 40.66 |
| 3* | 39.376 | 2.60 | 1.58313 | 59.4 | 39.57 |
| 4* | 19.086 | 12.09 | | | 34.05 |
| 5 | −149.535 | 1.30 | 1.49700 | 81.5 | 33.35 |
| 6 | 42.685 | 3.55 | | | 30.11 |
| 7 | −195.828 | 1.20 | 1.43875 | 94.7 | 29.98 |
| 8 | 27.111 | 1.08 | | | 27.96 |
| 9 | 34.838 | 4.66 | 1.72047 | 34.7 | 27.96 |
| 10 | −508.780 | (Variable) | | | 27.40 |

-continued

| UNIT: mm | | | | | |
|---|---|---|---|---|---|
| 11 (Diaphragm) | ∞ | 0.50 | | | 13.28 |
| 12 | 22.100 | 0.90 | 1.88300 | 40.8 | 13.77 |
| 13 | 13.090 | 5.48 | 1.51633 | 64.1 | 13.51 |
| 14 | −22.254 | 1.47 | | | 13.77 |
| 15 | −21.928 | 0.70 | 1.83481 | 42.7 | 13.50 |
| 16 | 20.583 | 3.00 | 2.00069 | 25.5 | 14.08 |
| 17 | −124.353 | 1.00 | | | 14.26 |
| 18 (Auxiliary Diaphragm) | ∞ | 2.22 | | | 14.40 |
| 19 | 28.757 | 0.80 | 2.05090 | 26.9 | 14.77 |
| 20 | 16.081 | 6.47 | 1.49700 | 81.5 | 14.44 |
| 21 | −17.564 | 0.80 | 1.75500 | 52.3 | 15.27 |
| 22 | 167.455 | 0.15 | | | 16.78 |
| 23 | 29.244 | 5.87 | 1.43875 | 94.7 | 18.47 |
| 24 | −25.744 | 0.15 | | | 19.61 |
| 25* | 31.191 | 6.27 | 1.49700 | 81.5 | 20.72 |
| 26 | −27.179 | (Variable) | | | 20.92 |
| 27 | 29.696 | 0.75 | 1.72916 | 54.7 | 19.29 |
| 28 | 17.581 | (Variable) | | | 18.46 |
| 29 | −23.901 | 1.50 | 1.85400 | 40.4 | 18.65 |
| 30* | 280.595 | 0.26 | | | 20.33 |
| 31 | 36.229 | 2.49 | 1.72825 | 28.5 | 22.47 |
| 32 | 118.225 | (Variable) | | | 22.96 |
| Image Plane | ∞ | | | | |

ASPHERIC DATA

3rd Surface

K = 0.00000e+000 A 4 = 7.28829e−005 A 6 = −3.12387e−007 A 8 = 1.01671e−009
A10 = −2.11222e−012 A12 = 2.79184e−015 A14 = −1.84122e−018

4th Surface

K = −5.56940e−001 A 4 = 8.13645e−005 A 6 = −2.68703e−007 A 8 = −1.48487e−010
A10 = 4.94390e−012 A12 = −1.70106e−014 A14 = 1.68710e−017

25th Surface

K = 0.00000e+000 A 4 = −2.30258e−005 A 6 = −6.54896e−008 A 8 = 1.46618e−010
A10 = −1.94958e−012 A12 = 6.26213e−015

30th Surface

K = 0.00000e+000 A 4 = 4.62125e−005 A 6 = 1.37240e−008 A 8 = 4.45799e−010
A10 = −4.84100e−012 A12 = 1.52924e−014

VARIOUS DATA
ZOOM RATIO 2.06

| | WIDE-ANGLE | MIDDLE | TELEPHOTO |
|---|---|---|---|
| Focal Length: | 11.33 | 16.77 | 23.30 |
| Fno: | 4.08 | 4.08 | 4.12 |
| Half Angle of View (°): | 52.93 | 41.82 | 32.77 |
| Image Height: | 18.57 | 21.64 | 21.64 |
| Overall lens length: | 135.25 | 125.30 | 120.88 |
| BF: | 16.69 | 22.62 | 28.39 |
| d10 | 31.65 | 14.80 | 3.48 |
| d26 | 1.40 | 1.53 | 2.50 |
| d28 | 8.34 | 9.17 | 9.32 |
| d32 | 16.69 | 22.62 | 28.39 |

-continued

| UNIT: mm | | |
|---|---|---|
| Zoom Lens Unit Data | | |
| Lens Unit | Starting Surface | Focal Length |
| 1 | 1 | −19.40 |
| 2 | 11 | 21.92 |
| 3 | 27 | −60.68 |
| 4 | 29 | −40.75 |

TABLE 1 summarizes various values in each numerical example.

TABLE 1

| | Inequality | Ex. 1 | Ex. 2 | Ex. 3 | Ex. 4 | Ex. 5 | Ex. 6 | Ex. 7 |
|---|---|---|---|---|---|---|---|---|
| (1) | −20 < Dist_w < −8 | −10.64 | −10.64 | −10.63 | −10.64 | −14.19 | −17.21 | −14.19 |
| (2) | −0.4 < F1/fLN < 0.7 | −0.24 | −0.01 | −0.20 | −0.31 | −0.22 | −0.22 | 0.48 |
| (3) | 1.0 < |fLIS/ft| < 4.0 | −1.72 | −2.91 | −2.17 | −2.23 | 1.30 | 1.20 | 1.26 |
| (4) | 0.00 ≤ dIS/dt < 0.25 | 0.06 | 0.10 | 0.12 | 0.12 | 0.00 | 0.06 | 0.00 |
| (5) | 0.1 < dLIS/dR < 10.0 | 1.49 | 0.32 | 0.74 | 0.36 | 4.54 | 5.18 | 4.34 |
| (6) | 30 < vLIS < 70 | 42.22 | 34.71 | 34.71 | 34.71 | 64.14 | 64.14 | 64.14 |
| (7) | −1.0 < (r1 + r2)/(r1 − r2) < 0.6 | −0.09 | −0.58 | 0.32 | 0.18 | −0.03 | −0.09 | 0.00 |
| (8) | −2.2 < f1/skw < −0.9 | −1.44 | −1.21 | −1.53 | −1.92 | −1.42 | −1.62 | −1.16 |
| (9) | −2.2 < f1/fw < −1.0 | −1.73 | −1.31 | −1.59 | −1.88 | −1.86 | −1.58 | −1.71 |
| (10) | −0.5 < fw/fLN < 0.3 | 0.14 | 0.01 | 0.13 | 0.10 | 0.12 | 0.14 | −0.28 |
| (11) | −1.5 < Ymax_w/f1 < −0.4 | −0.99 | −1.19 | −0.84 | −0.67 | −0.88 | −0.79 | −0.96 |

Image Pickup Apparatus

Figure 22:
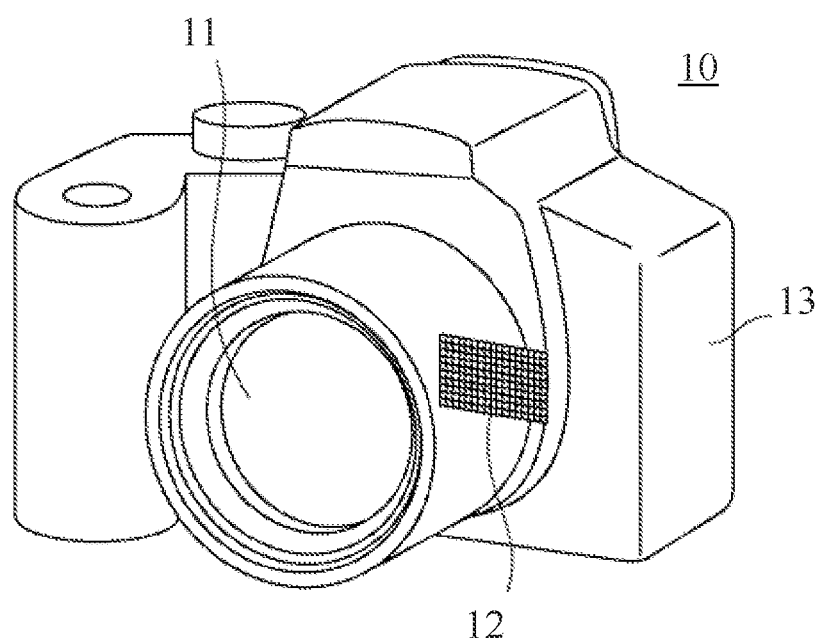
FIG. 22 is a schematic view of an image pickup apparatus.

Referring now to FIG. 22, a description will be given of an example of a digital still camera (image pickup apparatus) using a zoom lens L0 according to each example for an imaging optical system. In FIG. 22, reference numeral 10 denotes a camera body, and reference numeral 11 denotes an imaging optical system that includes any one of the zoom lenses L0 according to Examples 1 to 7. Reference numeral 12 denotes a solid-state image sensor (photoelectric conversion element) such as a CCD sensor and a CMOS sensor, which is built in the camera body, receives an optical image formed by the imaging optical system 11, and performs a photoelectric conversion. The camera body 10 may be a so-called single-lens reflex camera having a quick turn mirror, or a so-called mirrorless camera having no quick turn mirror.

The zoom lens L0 according to each example thus applied to an image pickup apparatus such as a digital still camera can provide an image pickup apparatus having a compact lens.

Each example can provide a zoom lens and an image pickup apparatus having the same, each of which can maintain a high optical performance in image stabilization while achieving both a wide angle of view and miniaturization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-013841, filed on Jan. 29, 2021, which is hereby incorporated by reference herein in its entirety.

What is claimed is:

1. A zoom lens comprising, in order from an object side to an image side, a first lens unit having a negative refractive power, and a rear group having a positive refractive power as a whole, including at least one lens unit, wherein a distance between the first lens unit and the rear group is changed during zooming, wherein the rear group includes a subunit that is moved in a direction having a component of a direction orthogonal to an optical axis during image stabilization, wherein the first lens unit includes, in order from the object side to the image side, three or more negative lenses, wherein a lens A which is disposed closest to the image side in the rear group includes a positive refractive power, wherein a lens surface of the lens A on the object side is concave toward the object side, wherein a lens surface of the lens A on the image side is concave toward the object side, and wherein the following inequalities are satisfied:

$$-20 < Dist\_w < -8;$$

$$-0.4 < f1/fLN < 0.7;$$

$$-2.2 < f1/skw \leq -1.16; \text{ and}$$

$$-1.5 < Ymax\_w/f1 < -0.5;$$

where Dist_w is a distortion amount at a maximum image height in an in-focus state at infinity at a wide-angle end, f1 is a focal length of the first lens unit, fLN is a focal length of a final lens unit closest to an image plane, skw is backfocus of the zoom lens at the wide-angle end, and Ymax_w is a maximum image height at the wide-angle end.

2. The zoom lens according to claim 1, wherein the following inequality is satisfied:

$$1.0 < |fLIS/ft| < 4.0;$$

where fLIS is a focal length of the subunit, and ft is a focal length of the zoom lens at a telephoto end.

3. The zoom lens according to claim 1, wherein the following inequality is satisfied:

$0.00 \leq dIS/dt < 0.25;$ where dIS is a distance on the optical axis from a lens surface closest to an object in the rear group to a lens surface closest to the object in the subunit at a telephoto end, and dt is an overall lens length of the zoom lens at the telephoto end.

4. The zoom lens according to claim 1, wherein the following inequality is satisfied:

$0.1 < dLIS/dR < 10.0;$ where dLIS is a distance on the optical axis from a lens surface closest to an object to a lens surface closest to the image plane in the subunit, and dR is a distance on the optical axis from a lens surface closest to the image plane in the subunit to a lens surface closest to the object in a lens unit adjacent to and disposed on the image side of the subunit at the wide-angle end.

5. The zoom lens according to claim 1, wherein the following inequality is satisfied:

$30 < vLIS < 70;$ where vLIS is an Abbe number of a lens having a shortest focal length in the subunit.

6. The zoom lens according to claim 1, wherein the following inequality is satisfied:

$-1.0 < (r1+r2)/(r1-r2) < 0.6;$ where r1 is a radius of curvature of a lens surface closest to an object in the subunit, and r2 is a radius of curvature of a lens surface closest to the image plane in the subunit.

7. The zoom lens according to claim 1, wherein the following inequality is satisfied:

$-2.2 < fl/fw < -1.0;$ where fw is a focal length of the zoom lens at the wide-angle end.

8. The zoom lens according to claim 1, wherein the following inequality is satisfied:

$-0.5 < fw/fLN < 0.3;$ where fw is a focal length of the zoom lens at the wide-angle end.

9. The zoom lens according to claim 1, wherein the subunit includes a positive lens and a negative lens.

10. The zoom lens according to claim 1, wherein the rear group includes two or more lens units disposed on the image side of the subunit, and a distance between the two or more lens units changes during zooming.

11. The zoom lens according to claim 1, wherein the rear group includes a focus unit disposed on the image side of the subunit, and configured to move during focusing.

12. The zoom lens according to claim 1, wherein at the wide-angle end, a distance between the first lens unit and the rear group is a largest among distances between lens units included in the zoom lens.

13. The zoom lens according to claim 1, wherein the first lens unit includes a positive lens.

14. The zoom lens according to claim 1, wherein the rear group includes, in order from the object side to the image side, a second lens unit having a positive refractive power, a third lens unit having a negative refractive power, a fourth lens unit having a negative refractive power, and fifth lens unit having a positive refractive power.

15. The zoom lens according to claim 1, wherein the rear group includes, in order from the object side to the image side, a second lens unit having a positive refractive power, a third lens unit having a negative refractive power, a fourth lens unit having a positive refractive power, a fifth lens unit having a negative refractive power, and a sixth lens unit having a positive refractive power.

16. The zoom lens according to claim 1, wherein the rear group includes, in order from the object side to the image side, a second lens unit having a positive refractive power, a third lens unit having a positive refractive power, a fourth lens unit having a negative refractive power, a fifth lens unit having a negative refractive power, and a sixth lens unit having a positive refractive power.

17. The zoom lens according to claim 1, wherein the rear group includes, in order from the object side to the image side, a second lens unit having a positive refractive power, a third lens unit having a negative refractive power, a fourth lens unit having a positive refractive power, a fifth lens unit having a negative refractive power, a sixth lens unit having a negative power, and a seventh lens unit having a positive refractive power.

18. The zoom lens according to claim 1, wherein the rear group has a focus unit that moves during focusing,
wherein a lens unit that moves during focusing is single,
wherein the focus unit consists of one lens, and
wherein the following inequality is satisfied:

$-20 < Dist\_w < -10;$ $-0.37 < fl/fLN < 0.7;$ and $-1.5 < Ymax\_w/fl < -0.6.$

19. The zoom lens according to claim 1, wherein the rear group has a focus unit that moves during focusing,
wherein a lens unit that moves during focusing is single,
wherein a lens unit disposed closest to the image side in the rear group is immovable during zooming, and
wherein the following inequality is satisfied:

$-1.88 \leq fl/fw < -1.0;$ where fw is a focal length of the zoom lens at the wide-angle end.

20. An image pickup apparatus comprising:
a zoom lens; and
an image sensor configured to receive an image formed by the zoom lens,
wherein the zoom lens includes, in order from an object side to an image side, a first lens unit having a negative refractive power, and a rear group having a positive refractive power as a whole, including at least one lens unit,
wherein a distance between the first lens unit and the rear group is changed during zooming,
wherein the rear group includes a subunit that is moved in a direction having a component of a direction orthogonal to an optical axis during image stabilization,
wherein the first lens unit includes, in order from the object side to the image side, three or more negative lenses,
wherein a lens A which is disposed closest to the image side in the rear group includes a positive refractive power,
wherein a lens surface of the lens A on the object side is concave toward the object side,
wherein a lens surface of the lens A on the image side is concave toward the object side, and wherein the following inequalities are satisfied:

$-20 < \text{Dist\_}w \leq -8;$ $-0.4 < f1/fLN < 0.7;$ $-2.2 < f1/skw \leq -1.16;$ and $-1.5 < Y\text{max\_}w/f1 \leq -0.5;$ where Dist_w is a distortion amount at a maximum image height in an in-focus state at infinity at a wide-angle end, f1 is a focal length of the first lens unit, fLN is a focal length of a final lens unit closest to an image plane, skw is a backfocus of the zoom lens at the wide-angle end, and Ymax_w is a maximum image height at the wide-angle end.

* * * * *